US011361104B1

(12) United States Patent
Kolli

(10) Patent No.: US 11,361,104 B1
(45) Date of Patent: Jun. 14, 2022

(54) METHOD AND SYSTEM FOR SECURING DATA STORED IN A CLOUD-BASED SOFTWARE SYSTEM

(71) Applicant: Jagannadha babu Kolli, Solon, OH (US)

(72) Inventor: Jagannadha babu Kolli, Solon, OH (US)

( * ) Notice: Subject to any disclaimer, the term of this patent is extended or adjusted under 35 U.S.C. 154(b) by 79 days.

(21) Appl. No.: 17/080,459

(22) Filed: Oct. 26, 2020

Related U.S. Application Data

(63) Continuation of application No. 16/210,690, filed on Dec. 5, 2018, now Pat. No. 10,817,619.

(Continued)

(51) Int. Cl.
*G06F 21/62* (2013.01)
*G06F 21/55* (2013.01)
(Continued)

(52) U.S. Cl.
CPC ........ *G06F 21/6245* (2013.01); *G06F 21/552* (2013.01); *G06F 21/554* (2013.01);
(Continued)

(58) Field of Classification Search
CPC .. G06F 21/6245; G06F 21/552; G06F 21/554; G06F 21/602; G06F 21/604;
(Continued)

(56) References Cited

U.S. PATENT DOCUMENTS 9,183,376 B2 12/2015 Shinoda
9,569,449 B2 2/2017 Taylor et al.
(Continued)

FOREIGN PATENT DOCUMENTS

CA 3042934 A1 * 11/2019 ........... G06F 16/353
CN 102915331 A * 2/2013 ............. G06F 15/16
(Continued)

OTHER PUBLICATIONS

Mirkovic et al., "Security evaluation in cloud", IEEE, 2013 36th International Convention on Information and Communication Technology, Electronics and Microelectronics (MIPRO), 2013, pp. 1088-1093. (Year: 2013).*

(Continued)

*Primary Examiner* — Peter G Shaw
(74) *Attorney, Agent, or Firm* — Calfee, Halter & Griswold LLP

(57) ABSTRACT

A method of and system for securing data stored in a cloud-based software system is disclosed. A cloud data security system routinely scans files and analyzes the cloud system events to determine potential data loss/leak, and notifies users of the cloud system in real-time. The cloud data security system suggests appropriate classification levels and optimal security settings to the user by collecting actions and behaviors of other users of the cloud data security system within an organization or others who perform similar job duties in different organizations and/or locations. The cloud data security system enhances data security by providing visibility, actionable insights, and awareness on risks associated with the data, not only to administrators but also to end users of the cloud-based software system in real-time.

22 Claims, 17 Drawing Sheets

Related U.S. Application Data

(60) Provisional application No. 62/594,643, filed on Dec. 5, 2017.

(51) Int. Cl.

| | |
|---|---|
| ***G06F 21/60*** | (2013.01) |
| ***H04L 9/40*** | (2022.01) |
| ***H04L 67/10*** | (2022.01) |
| ***G06N 20/00*** | (2019.01) |

(52) U.S. Cl.
CPC .......... *G06F 21/602* (2013.01); *G06F 21/604* (2013.01); *G06N 20/00* (2019.01); *H04L 63/0807* (2013.01); *H04L 63/102* (2013.01); *H04L 63/205* (2013.01); *H04L 67/10* (2013.01); *G06F 2221/2141* (2013.01)

(58) Field of Classification Search
CPC ............ G06F 2221/2141; G06N 20/00; H04L 63/0807; H04L 63/102; H04L 63/205; H04L 67/10
USPC .......................................................... 726/28
See application file for complete search history.

(56) References Cited

U.S. PATENT DOCUMENTS

| | | | | |
|---|---|---|---|---|
| 9,633,224 | B1 | 4/2017 | Dutta | |
| 10,179,835 | B2 | 1/2019 | Muller et al. | |
| 10,817,619 | B1 | 10/2020 | Kolli | |
| 2013/0055161 | A1* | 2/2013 | Adams | G06F 16/904 715/811 |
| 2014/0026182 | A1 | 1/2014 | Pearl et al. | |
| 2019/0268379 | A1* | 8/2019 | Narayanaswamy | H04L 63/1408 |
| 2022/0043808 | A1* | 2/2022 | Helm | G06F 3/0604 |

FOREIGN PATENT DOCUMENTS

| | | | | | |
|---|---|---|---|---|---|
| CN | 108062484 | A | * | 5/2018 | |
| CN | 105871854 | B | * | 11/2018 | H04L 63/0815 |
| WO | WO-2016138067 | A1 | * | 9/2016 | G06F 21/6218 |
| WO | WO-2017182363 | A1 | * | 10/2017 | H04L 12/2807 |

OTHER PUBLICATIONS

Jayakody et al., "Web-application Security Evaluation as a Service with Cloud Native Environment Support", IEEE, doi: 10.1109/ICAC49085.2019.9103414, 2019, pp. 357-362. (Year: 2019).*

Huang et al., "An OpenFlow-based collaborative intrusion prevention system for cloud networking", IEEE, doi: 10.1109/ICCSN.2015.7296133, 2015, pp. 85-92. (Year: 2015).*

Ucur et al. "Data Loss Prevention and Data Protection in Cloud Environments Based on Authentication Tokens", doi: 10.1109/CSCS .2019.00128, 2019, pp. 720-725 (Year: 2019).

Ong et al. "Context-Aware Data Loss Prevention for Cloud Storage Services", doi: 10.1109/CLOUD.2017.58, 2017, pp. 399-406 (Year: 2017).

* cited by examiner

REPLACEMENT SHEETS
U.S. Application No.: 17/080,459
14/17

FIG. 13
1302
Alert!
Hello Matt,
Potential Data
Loss detected
unauthorized IP
174.168.1.1
1304
1306
1300

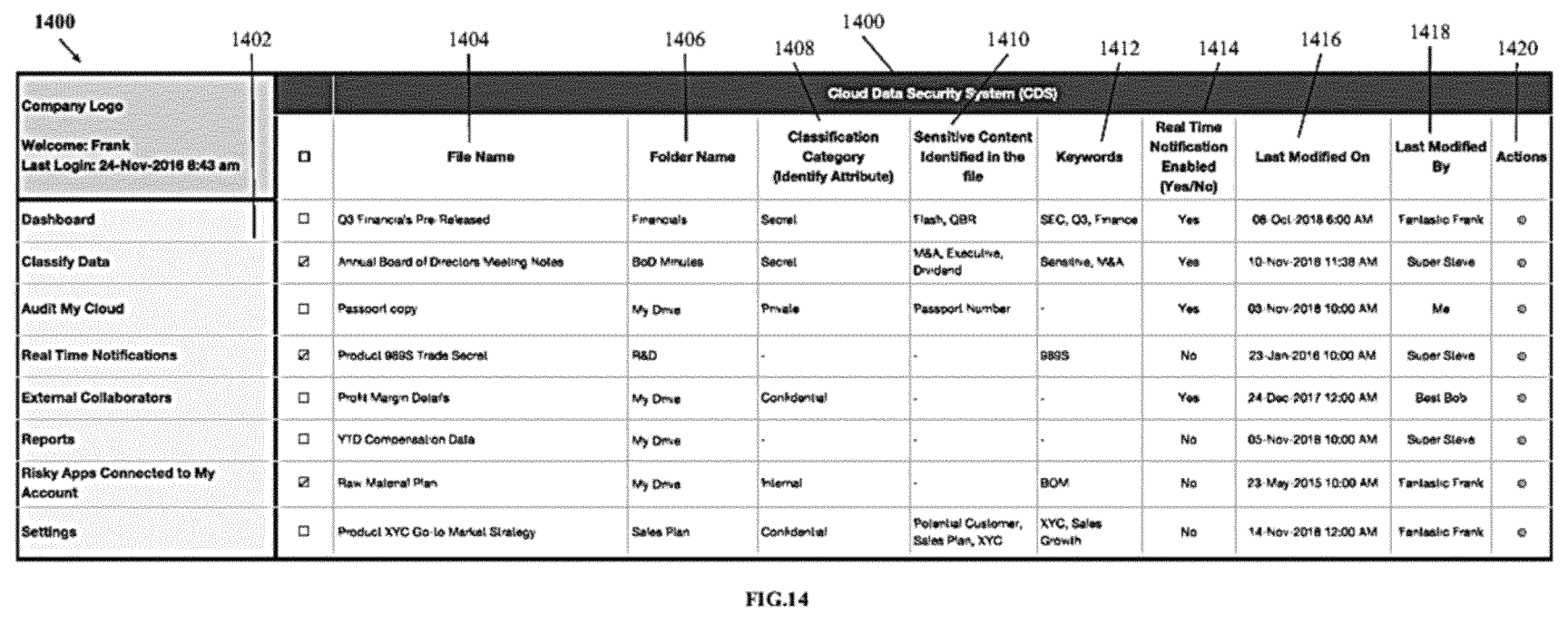

1400 1402 1404 1406 1408 1400 1410 1412 1414 1416 1418 1420

| Company Logo<br>Welcome: Frank<br>Last Login: 24-Nov-2018 8:43 am | Cloud Data Security System (CDS) | | | | | | | | | |
|---|---|---|---|---|---|---|---|---|---|---|
| | ☐ | File Name | Folder Name | Classification Category (Identify Attribute) | Sensitive Content Identified in the file | Keywords | Real Time Notification Enabled (Yes/No) | Last Modified On | Last Modified By | Actions |
| Dashboard | ☐ | Q3 Financial's Pre-Released | Financials | Secret | Flash, QBR | SEC, Q3, Finance | Yes | 08-Oct-2018 6:00 AM | Fantastic Frank | ⚙ |
| Classify Data | ☑ | Annual Board of Directors Meeting Notes | BoD Minutes | Secret | M&A, Executive, Dividend | Sensitive, M&A | Yes | 10-Nov-2018 11:38 AM | Super Steve | ⚙ |
| Audit My Cloud | ☐ | Passport copy | My Drive | Private | Passport Number | - | Yes | 03-Nov-2018 10:00 AM | Me | ⚙ |
| Real Time Notifications | ☑ | Product 989S Trade Secret | R&D | - | - | 989S | No | 23-Jan-2016 10:00 AM | Super Steve | ⚙ |
| External Collaborators | ☐ | Profit Margin Details | My Drive | Confidential | - | - | Yes | 24-Dec-2017 12:00 AM | Best Bob | ⚙ |
| Reports | ☐ | YTD Compensation Data | My Drive | - | - | - | No | 05-Nov-2018 10:00 AM | Super Steve | ⚙ |
| Risky Apps Connected to My Account | ☑ | Raw Material Plan | My Drive | Internal | - | BOM | No | 23-May-2015 10:00 AM | Fantastic Frank | ⚙ |
| Settings | ☐ | Product XYC Go-to Market Strategy | Sales Plan | Confidential | Potential Customer, Sales Plan, XYC | XYC, Sales Growth | No | 14-Nov-2018 12:00 AM | Fantastic Frank | ⚙ |

FIG.14

METHOD AND SYSTEM FOR SECURING DATA STORED IN A CLOUD-BASED SOFTWARE SYSTEM

CROSS REFERENCE TO RELATED APPLICATIONS

This application is a continuation of U.S. Ser. No. 16/210,690 filed Dec. 5, 2018 titled "Method and System for Securing Data Stored in a Cloud-Based Software System", which claims priority to, and any other benefits of, U.S. Provisional Patent Application Ser. No. 62/594,643, filed on Dec. 5, 2017 and titled "Cloud Classification and Real Time Data Loss Notification System", which is hereby fully incorporated by reference.

FIELD OF INVENTION

The present invention generally relates to cloud data security and, more particularly, to classification of the sensitivity of the data, field-level keyless encryption, identification and prevention of potential data loss/leaks and, delivery of notifications directly to the end user in real-time in the event of potential data loss or leak.

BACKGROUND

The protection of sensitive personal, health, finance data and valuable intellectual property has gained momentum in the wake of recent high-profile data breaches. The number of such data breach incidents is increasing steadily with no foreseeable end in sight. As cloud computing continues to gain popularity and more users store sensitive data on cloud-based software systems, data security has become increasingly vital to every organization which desires to comply with various regulatory requirements and retain a competitive advantage.

As a result, many organizations are now placing an increased focus on controlling access to data or encrypting the data stored in the cloud by deploying cloud data loss prevention (DLP) tools. However existing techniques used by cloud DLP tools fail to provide an efficient solution. This is primarily because cloud DLP tools usually monitor usage of cloud data and third-party apps at an organizational level and provide visibility only to cloud administrators and security analysts, leaving behind the end users who create or own the data. Cloud DLP tools do not have the capability of identifying and classifying the type of data that needs to be protected upon creation or before sharing it with others. In addition, cloud DLP tools place too much restriction on the data by encrypting the entire file or document, and thus create friction between data usage and its security. Last, the cloud DLP tools place the security of cloud data in the hands of cloud administrators or security analysts who may fail to detect important signals from the noise as they may lack context of the potential incident when compared to the end users.

Therefore, what is needed is, a simple yet comprehensive approach, which brings users of a cloud-based software system in to the effort along with the administrators to secure the data stored in the cloud.

SUMMARY

The object of the present invention is to provide users of a cloud-based software system (hereinafter referred to as a "cloud system") such as Box®, Dropbox®, Google G Suite®, Slack®, Microsoft Office 365®, Salesforce®, etc., with a simple yet comprehensive system for and method of protecting sensitive personal, private, and business data from unauthorized use through classification of data; keyless encryption of sensitive content; identification, notification, and prevention of potential data loss/leak while the data is in use, in motion or at rest; and by educating users of the cloud system about the potential risks and remediation actions in real-time. An exemplary system for and method of securing the data stored in the cloud system comprises a Cloud Data Security system (CDS) that may encompass the necessary software and hardware.

Another object of the invention is to 'decentralize' data security. Currently, security of the data stored in a cloud system is controlled by administrators of the cloud system. When data is leaked or lost, the administrators have the ability to see the incident along with potentially hundreds of other such incidents daily. However, the administrators may not be able to quickly determine if an incident is a real threat vs. a false-positive as they may not have the required context to confirm the incident before significant damage is made to the organization. On the other hand, end users typically discover foul play very quickly on their own when they have the same level of visibility as of an administrator. It is thus much more efficient to engage end users in the data security process as they have the context to more quickly understand if something is truly suspicious. An exemplary embodiment is comprised of a system separate from, but residing on, the cloud and functioning on behalf of the end user. A user having access to the cloud system grants the permission to the cloud data security system allowing the user to monitor and secure data on their own, decentralizing the overall cloud data security process.

Another object of the invention is to use a 'distributed' approach which helps users of the cloud system take best actions that enhance security of the data by monitoring behaviors and actions of other users (also referred to as 'peer knowledge'). In an exemplary embodiment, the Cloud Data Security system (CDS) provides recommendations to the user with regard to classification and optimal security settings where the recommendations are derived based on aggregated information collected through other user's actions or inputs; or based on actions taken by other users in similar organizations or roles. For example: by tracking actions of users who work in organizational types such as manufacturing, insurance, banking sector, etc., or departments such finance, HR, marketing etc. Other criteria for determining the recommendations may also include a user's location, language, the type of data they handle routinely, the type of classification and security settings which they apply to particular type of data, keywords, or data filters, etc. Additionally, similar criteria can be used to automatically protect the data stored in the cloud system using machine learning algorithms. For example, in an exemplary embodiment the cloud data security system scans contents of a user's file stored in the cloud system and applies classification markings and security settings to the file automatically based on what other users of the cloud data security system have prescribed in the past. In this exemplary embodiment, the Cloud Data Security system (CDS) aggregates and keeps track of what classifications and security settings have been most successful or have the best track record of keeping similar data safe in the cloud system. Such recommendations and automatic actions have the potential to further enhance proper security decisions amongst users.

Another object of the invention is to protect data stored in a cloud system by encrypting sensitive data and/or specific portions of a file stored in the cloud system. In an exemplary embodiment, the cloud data security system scans contents of a file stored in the cloud system and executes an algorithm that encrypts sensitive content with in the file in accordance with the organization's sensitive data filters, data security policies, data governance rules, and/or related controls. In an exemplary embodiment, this is done with a unique cryptographic hash that acts as a digital fingerprint. Once a file is altered, only the user, i.e. the owner of the file, can view, edit or decrypt the encrypted content.

Another object of the invention is to protect data stored in a cloud system based on data classification. In an exemplary embodiment, the cloud data security system (CDS) scans files stored in the cloud system and determines appropriate classification category based on sensitivity of the data relative to the risk. The classification category identified and presented to the user such that the user can take actions to necessary to secure the file. In another exemplary embodiment, CDS may categorize the data stored in a cloud system based on sensitivity of the data relative to the risk, and automatically assign optimal security settings in accordance with the organization's sensitive data filters, data security policies, data governance rules, and/or related controls.

Another object of the invention is to create an awareness and provide visibility to the risks associated with the data to the users of a cloud system by detecting potential threats and alerting the users in real-time. In certain exemplary embodiments, the cloud data security system detects if data stored in a cloud system gets tampered with and captures details such as who accessed the data, when they accessed it, and what took place. An alert is then sent to the user, in this case owner of data along with the administrator of the cloud system, by email, SMS, or a push notification etc., in real time. This alert is based on user preferences or in accordance with an organization's sensitive data filters, data security policies, data governance rules, and/or related controls.

Another object of the invention is to allow an end user of the cloud system to take actions to mitigate risks when they receive a potential data breach alert. For example, if an end user of the cloud system is informed that a file containing sensitive data has been tampered with, he/she may choose to delete the sensitive content or change the sharing settings to restrict access to the file.

It should be noted that many of the inventive concepts are applicable to data and files that are stored in locations other than cloud-based software systems. Therefore, the described and claimed exemplary embodiments should not be limited to just cloud-based software systems.

The invention herein described is capable of other embodiments and of being practiced and carried out in various ways which will be obvious to those skilled in the art. Also, it is to be understood that the phraseology and terminology employed herein are for the purpose of description and should not be regarded as limiting. As such, those skilled in the art will appreciate that the conception upon which this disclosure is based may readily be utilized as a basis for designing other systems for and methods of carrying out the several purposes of the present disclosed exemplary embodiments. It is important, therefore, that the claims be regarded as including such equivalent construction and methodology insofar as they do not depart from the spirit and scope of the present invention. As used in the claims to describe the various inventive aspects and embodiments, the term "comprises" or "comprising" means including, but not limited to, whatever follows the word "comprising". Thus, use of the term "comprising" indicates that the listed elements are required or mandatory, but that other elements are optional and may or may not be present.

The object, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The accompanying drawings, which are incorporated herein and form a part of the specification, illustrate some, but not the only or exclusive, examples of embodiments and/or features. The schematic flow chart diagrams included herein are generally set forth as logical flow chart diagrams. As such, the depicted order and labeled steps are indicative of one exemplary embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. Additionally, the order in which a particular method occurs may or may not strictly adhere to the order of the corresponding steps shown.

FIG. 14 shows a graphical user interface of the cloud data security system for applying classification and security settings to multiple files stored in a cloud system according to an exemplary embodiment.

Figure 1:
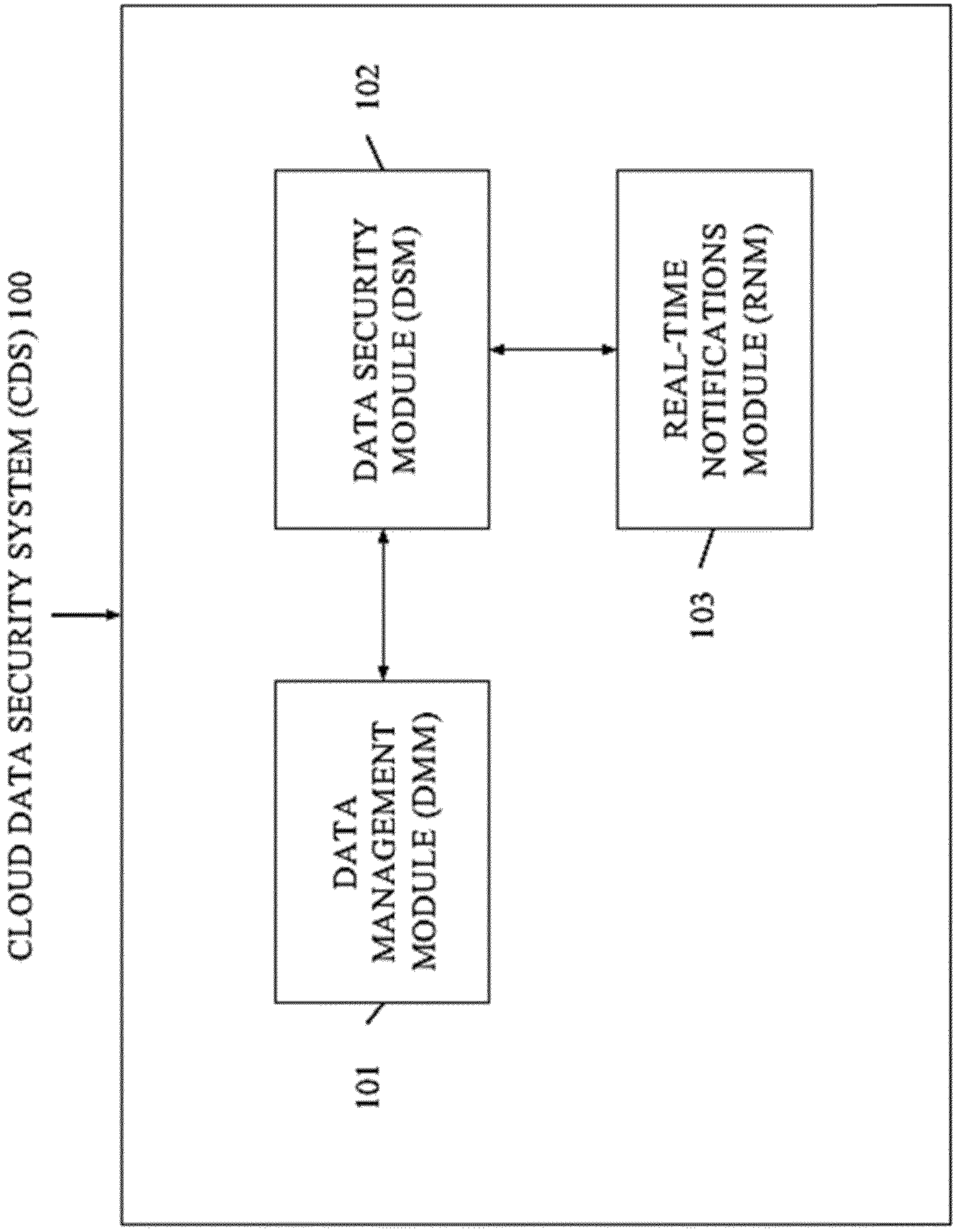
FIG. 1 shows a general representation of an exemplary embodiment of a cloud data security system.

Other aspects of the present invention shall be more readily understood when considered in conjunction with the accompanying drawings, and the following detailed description, neither of which should be considered limiting.

DETAILED DESCRIPTION

A detailed description of one or more exemplary embodiments of the invention is provided below along with accompanying figures that illustrate the principles of the invention. The invention is described in connection with such exemplary embodiments, but the invention is not limited to any particular embodiment. Thus, the invention may encompass numerous alternatives, modifications, or equivalents, and can be implemented as a computer program; a process; a system; an apparatus; a software product embodied on a computer storage medium; and/or a processor such that the processor is configured to execute instructions stored on and/or provided by an internal or external memory connected to the processor.

The terminology used herein is intended to be interpreted in its broadest reasonable manner, even though it is being used in conjunction with a detailed description of certain specific examples of the technology. For the purpose of clarity, technical materials, details of certain algorithms, cloud authentication, access mechanisms that are known in the fields related to the invention haven't been described in detail so that the invention is not obscured unnecessarily. Certain terms may even be emphasized below; however, any terminology intended to be interpreted in a restricted manner will be overtly and specifically defined as such in this detailed description section.

Reference throughout this specification to 'an embodiment', 'exemplary embodiment', 'one example,' or similar language means that a particular function, feature, characteristic or structure described in connection with the embodiment is included in at least one embodiment of the present invention. Thus, appearances of the phrases "in one embodiment," "in an embodiment," "in certain embodiments" and similar language throughout this specification may, but do not necessarily, all refer to the same embodiment.

Furthermore, the described functions, features, characteristics or structures of the invention may be combined in any suitable manner in one or more embodiments. In the following description, numerous specific details are provided, such as examples of programming, software modules, user selections, network transactions, database structures, queries, hardware modules, etc., to provide a thorough understanding of embodiments of the invention. These details are provided for the purpose of example and one skilled in the relevant art can recognize, however, that the invention may be practiced according to the claims without one or more of the specific details, or with other methods, components, materials, and so forth.

As used herein, the term "cloud system" refers to computing resources, including hardware and software, that are delivered as a service over a network. Additionally, or alternatively, the cloud system may include a cloud storage service or other types of cloud services such as content management, content synchronization, and/or content sharing services. Examples of a cloud system include, without limitation, Box®, Dropbox®, Google G Suite®, Slack®, Microsoft Office 365®, Google Cloud Storage®, Amazon Glacier®, Amazon S3® Salesforce®, etc.

As used herein, "data" refers to structured or unstructured information stored usually in a file format such as, but not limited to, PDF, Excel, PowerPoint presentations, Word documents, j son, rich text, dwg, csv, Google Docs, Google Sheets, Google Slides, plain text, etc.

As used herein, "encryption" means the process of converting information or data into a code, especially to prevent unauthorized access.

As used herein, "field-level" means specific text or select portion(s) of a file or document.

As used herein, "user" may refer to an administrator in an organization who manages a cloud system; an employee within the organization who uses the cloud system; or a consumer of a cloud system.

As used herein, "cryptographic hash" refers to an encrypted text which is generally derived by replacing original text with other text, numbers and/or symbols through substitution and/or transposition.

As used herein, "data filter" refers to set of terms, phrases, string of characters, expressions, and search patterns that identity various types of information. In particular, this includes information, that if lost or leaked, could lead to significant financial, legal or reputational damage to an individual or organization. Examples of such information include, without limitation, Personally Identifiable Information (PII), Protected Health Information (PHI), Payment Card Industry regulation (PCI) related information, Social Security Numbers (SSN), bank swift codes, tax identification numbers, censored terms or phrases, business keywords such as MBR, YBR, QBR, Finpack, flash, etc.

As used herein, "cipher" refers to an algorithm for performing encryption or decryption.

As used herein, "processor" refers to one or more devices, circuits, and/or processing cores configured to process computer program instructions.

Exemplary embodiments described herein include a Cloud Data Security system (CDS) 100 that provides simple yet comprehensive security for the data stored in a cloud system. CDS 100 implements functionalities such as classification, encryption, identification of potential data leak or loss events, and notifying users about such events in real-time. CDS 100 integrates with numerous cloud systems and works with files stored in such cloud systems, extending the capabilities of some of the cloud systems. For example, CDS 100 may classify files automatically, encrypt specific contents within the file even though some of the cloud system service providers don't offer such capability natively. The cloud data security system can run on a typical web-server hosted in a home or enterprise data center network; run as on add-on in the existing cloud system; or on a cloud-based computing service.

In an exemplary embodiment the CDS 100 comprises of a processor, whether actual or virtual, depending upon the embodiment, executes instructions to perform the steps described herein. The instructions may be stored in a memory that is local to the process or may be stored in a memory that is remote from the processor. The CDS 100 can comprise a plurality of processors that together perform the functions of the various modules comprised by the CDS 100, alternatively, the functions of the CDS 100 can be performed by a single processor. The CDS 100 is compatible with a plurality of operating systems such as, but not limited to: Microsoft Windows™, Linux™, Apple iOS™, macOS™ and Android™ and also compatible with a multitude of hardware platforms such as, but not limited to: Wintel, Linux and the like.

Figure 3:
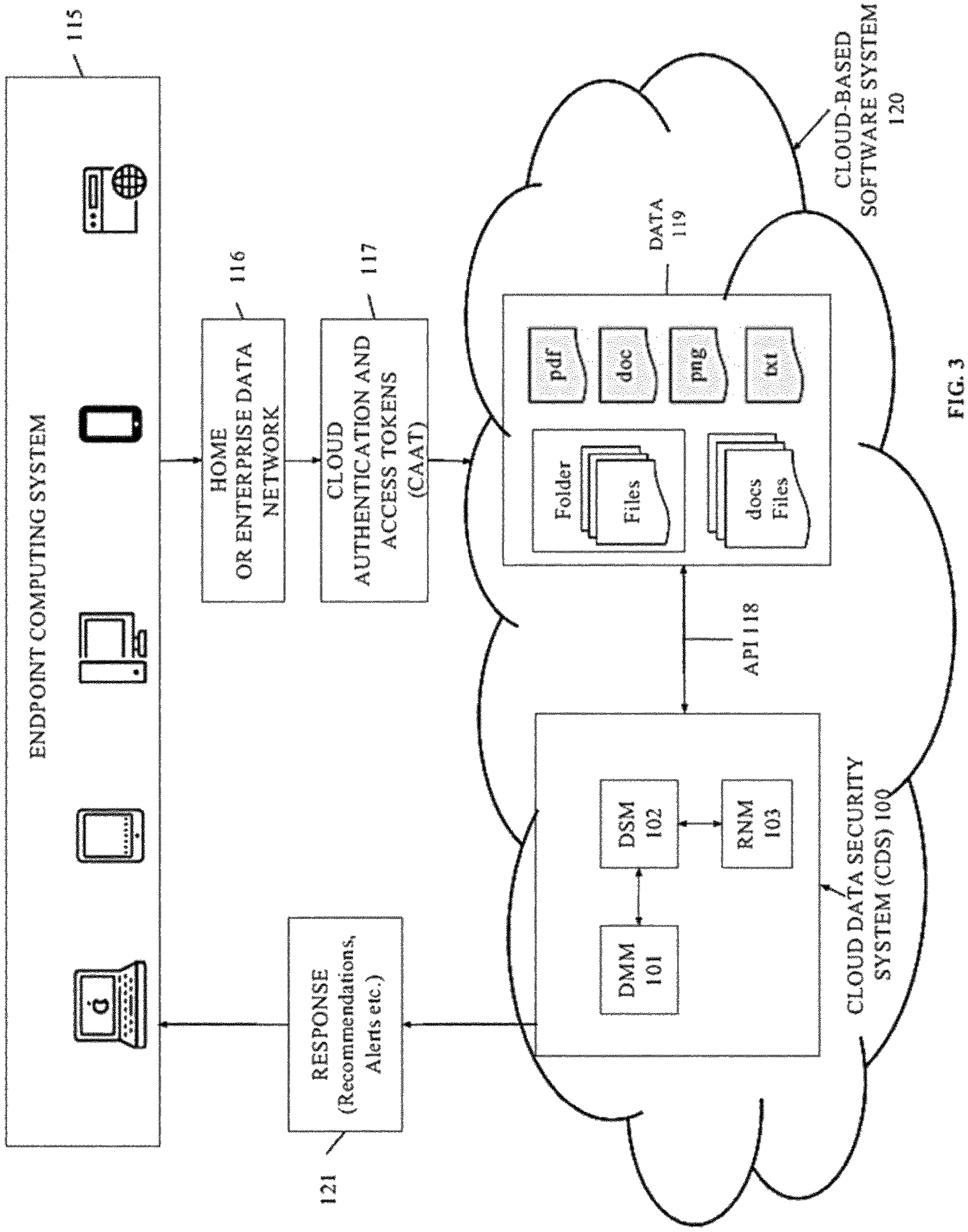
FIG. 3 illustrates a diagram of an exemplary embodiment wherein the cloud data security system is hosted on the same the cloud system where the data is stored.

In certain exemplary embodiments, the CDS 100 can be hosted with in a cloud-based software system such as Google G Suite®, Slack®, Microsoft Office 365® etc., as shown in FIG. 3. In such embodiments, the CDS 100 may be hosted within the same cloud system 120 in which a user stores the data 119 as illustrated. In certain exemplary embodiments, CDS 100 uses the cloud system Application Programming Interface (API) 118 to access and manage the data 119 stored in the cloud system 120. This presumes that the correct cloud authorization and access tokens 117 have been made available to the CDS 100. In such embodiments, users may interact with the CDS 100 which runs as an add-on, hosted with in the cloud system 120 using a variety of end point computing systems or clients 115 such as web, desktop, mobile etc., via a network 116.

Figure 4:
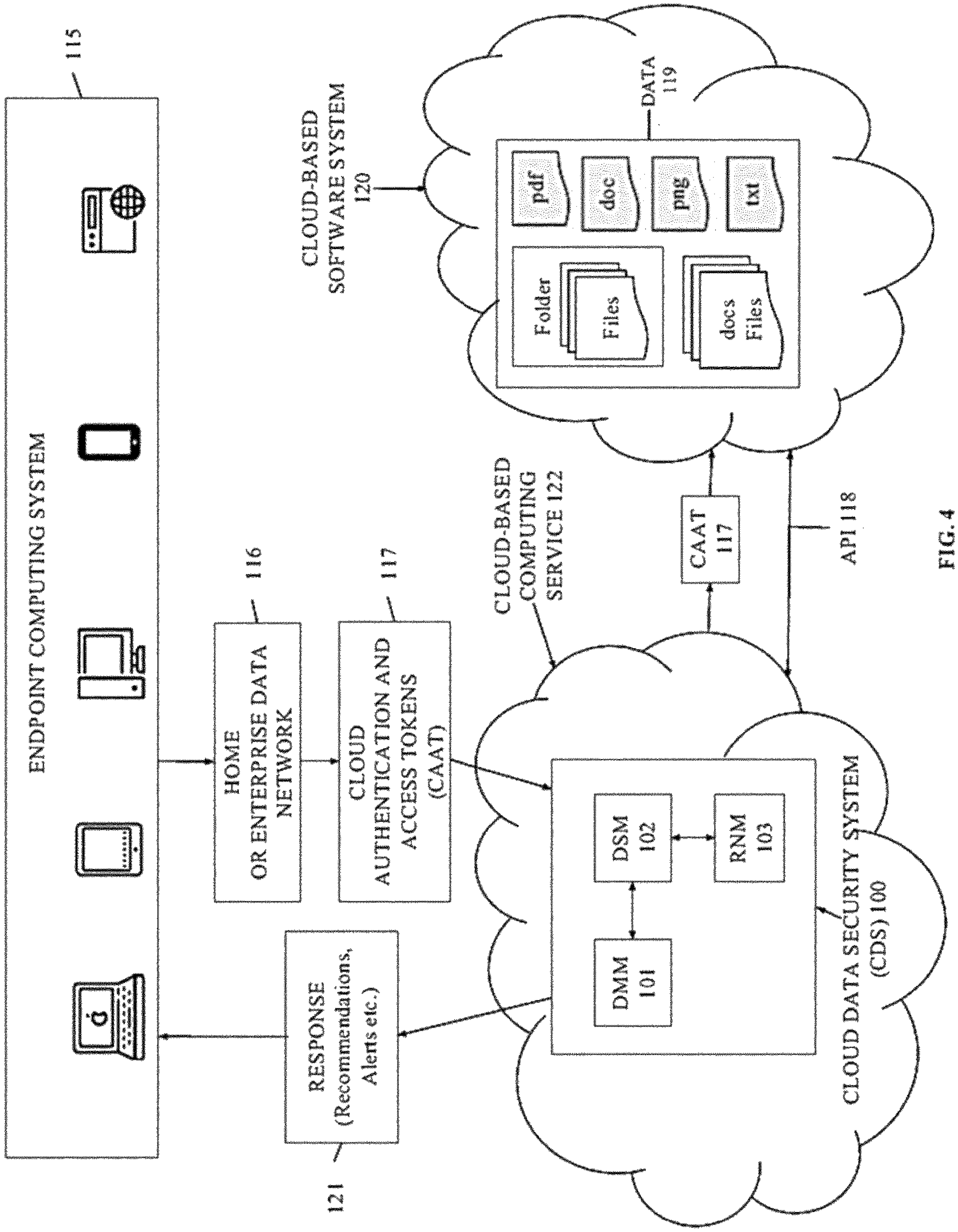
FIG. 4 illustrates a diagram of an exemplary embodiment wherein the cloud data security system is hosted on a cloud system which is different from the cloud system where the data is stored.

In certain exemplary embodiments, the CDS 100 can be hosted on cloud-based computing service 122 such as Google Cloud Platform (GCP), Amazon Web services (AWS) etc., which are different than the cloud system 120 as shown in FIG. 4. Since the data 119 and Cloud Data Security system (CDS) 100 and are located on different services, the cloud authorization and access tokens 117 are received by the CDS 100 and forwarded to the cloud system 120 when the CDS 100 attempts to access the data 119 stored therein.

Figure 5:
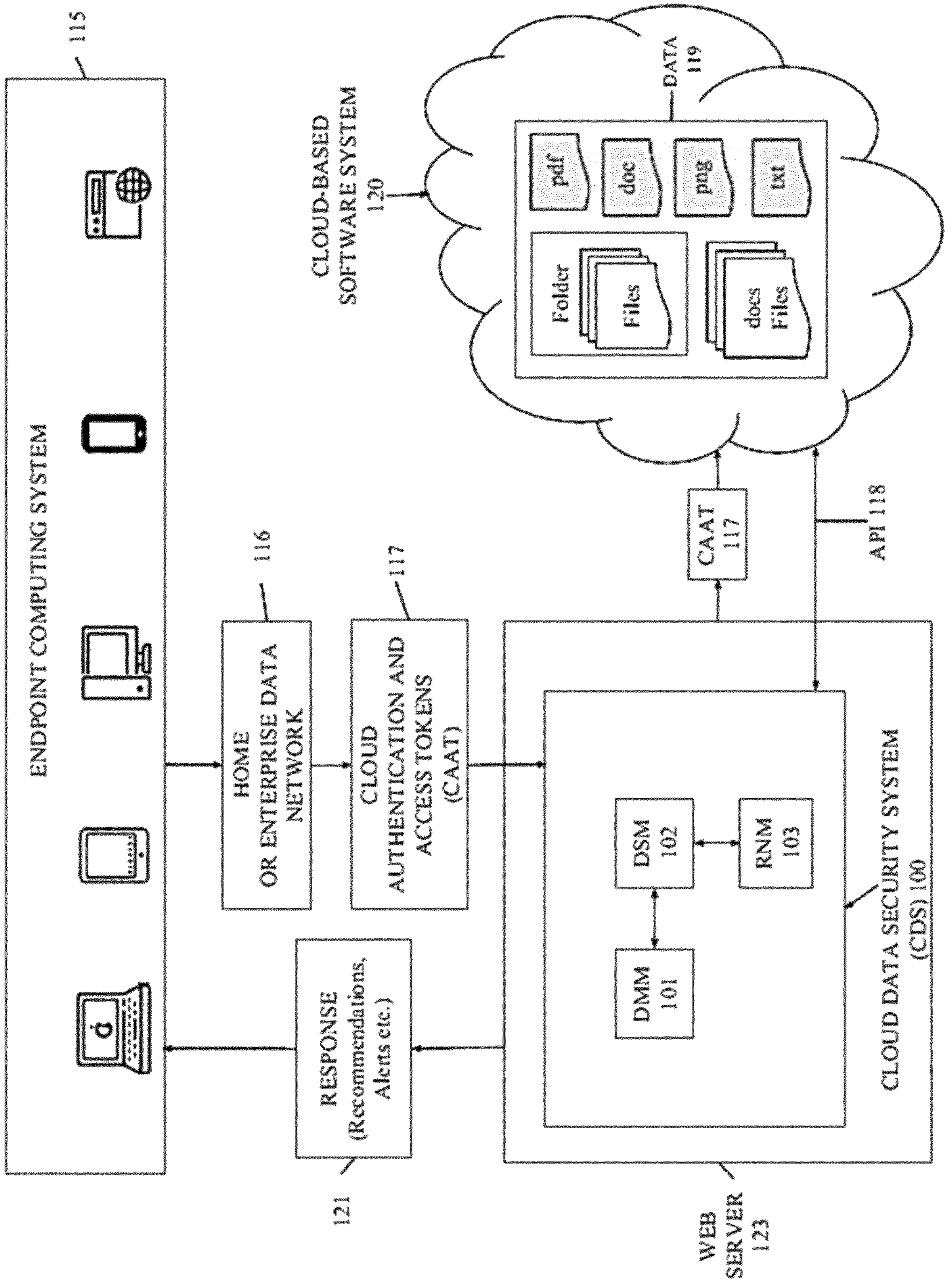
FIG. 5 illustrates a diagram of an exemplary embodiment wherein the cloud data security system is hosted on a web server which resides on a home or enterprise data network.

In another exemplary embodiment, the CDS 100 can be hosted on a web server 123 as shown in FIG. 5. In such exemplary embodiment, the web server 123 can be hosted on a third-party private data network or may be hosted on a home or enterprise data network and which can further connect to a cloud system 120 where users store the data 119. FIG. 5 also illustrates an interaction between a variety of endpoint computing systems or clients 115 such as web, desktop, mobile etc., and CDS 100 via a home or enterprise network 116. In an exemplary embodiment CDS 100 connects to the cloud system 120 where users store the data 119, using a cloud authentication and access token 117. The illustrated embodiment differs from the embodiments illustrated in FIGS. 3 and 4 in that the endpoint computing system 115 authenticates to CDS 100 directly and CDS 100 provides the cloud authentication and access tokens 117 necessary to access the data stored in the cloud system 120.

Figure 1A:
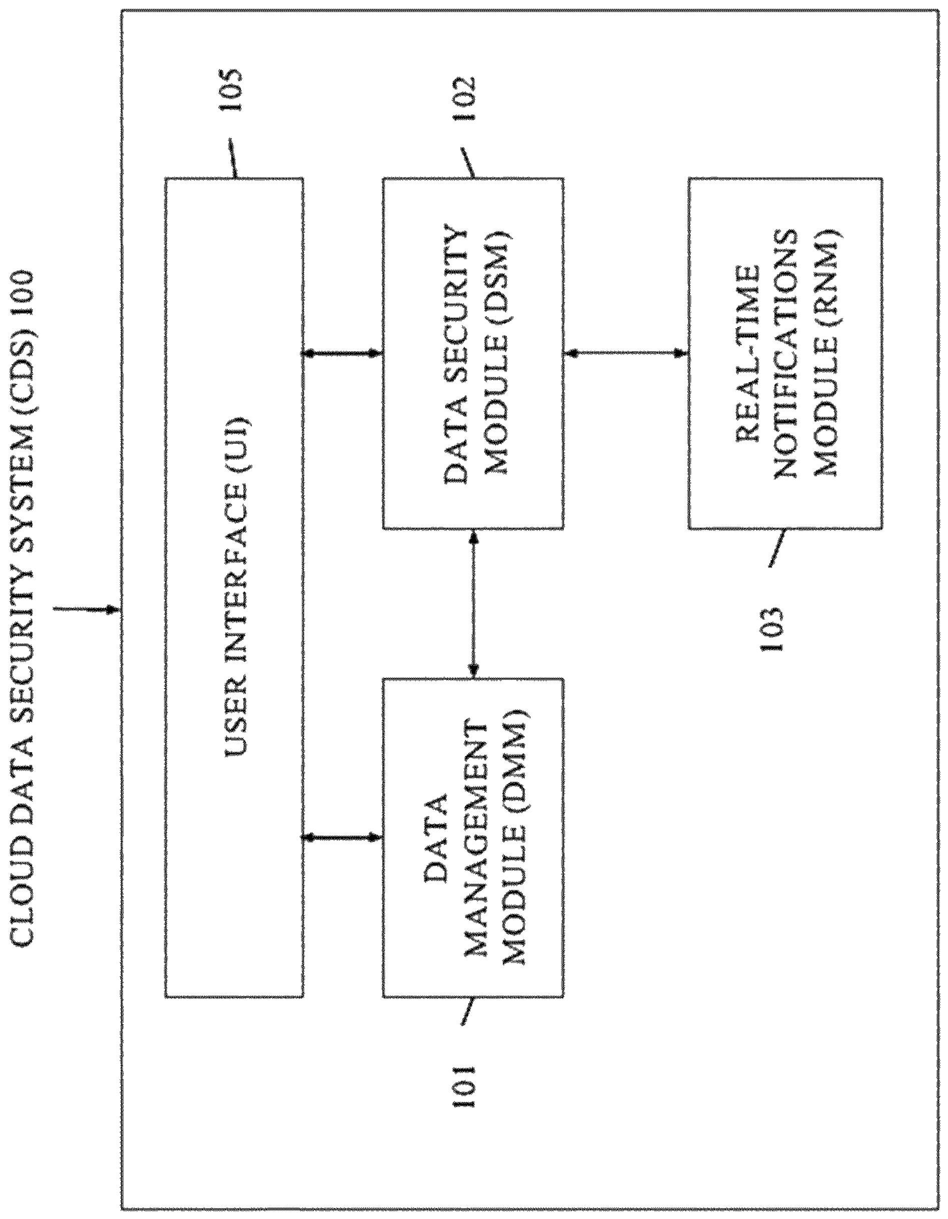
FIGS. 1A and 1B show a general representation of the cloud data security system along with the functional modules according to an exemplary embodiment.

Various functional modules of the CDS 100 are now provided. In certain exemplary embodiments, the CDS 100 contains at least three functional modules namely Data management module (DMM) 101, Data Security Module (DSM) 102 and Real-time Notifications Module (RNM) 103 as shown in FIG. 1. In some exemplary embodiments the three functional modules DMM 101, DSM 102, and RNM 103 may contain submodules as depicted in FIG. 1A, FIG. 1B and FIG. 2, which perform necessary functionalities described of exemplary embodiments.

Figure 1B:
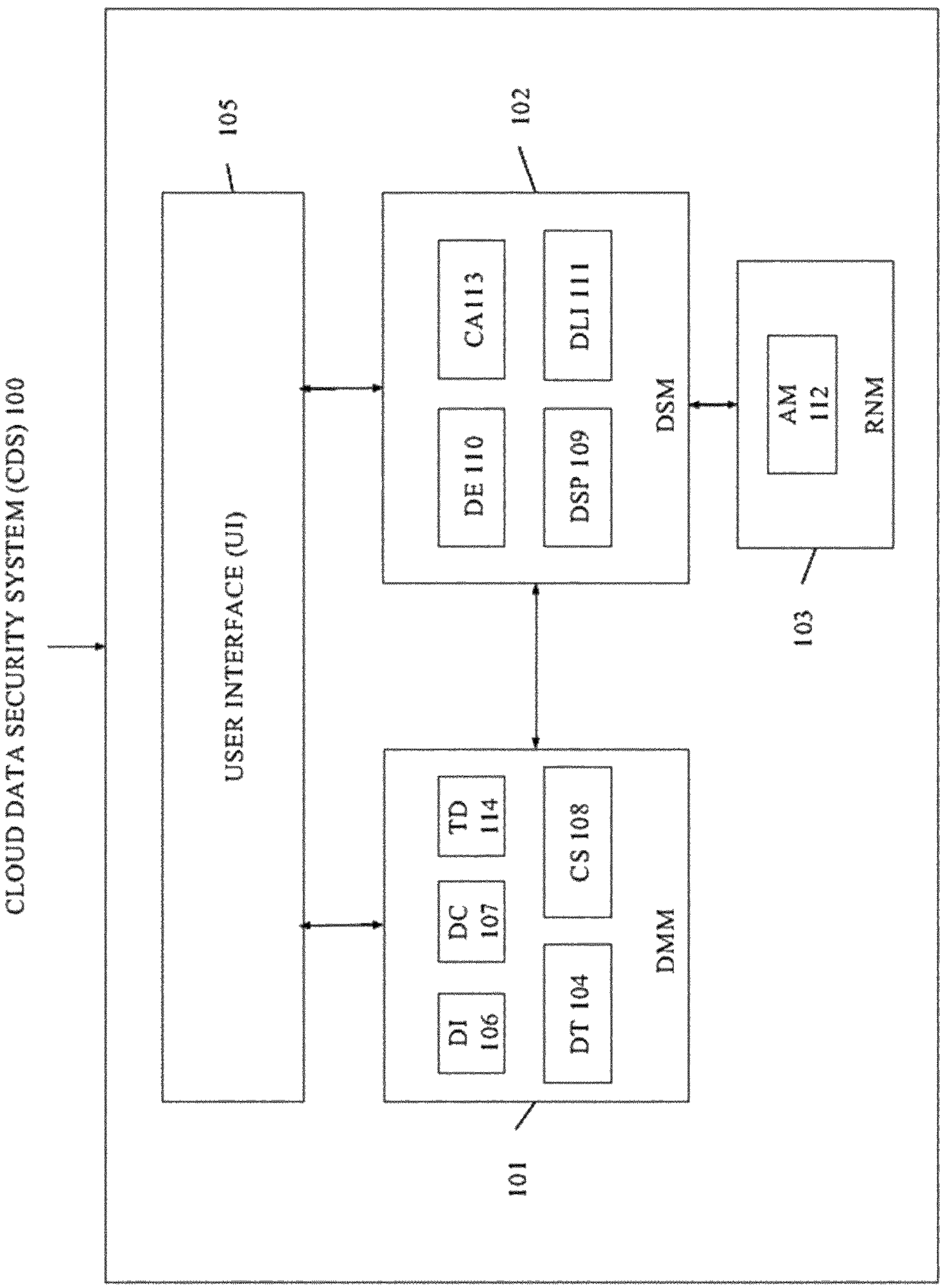
Figure 2:
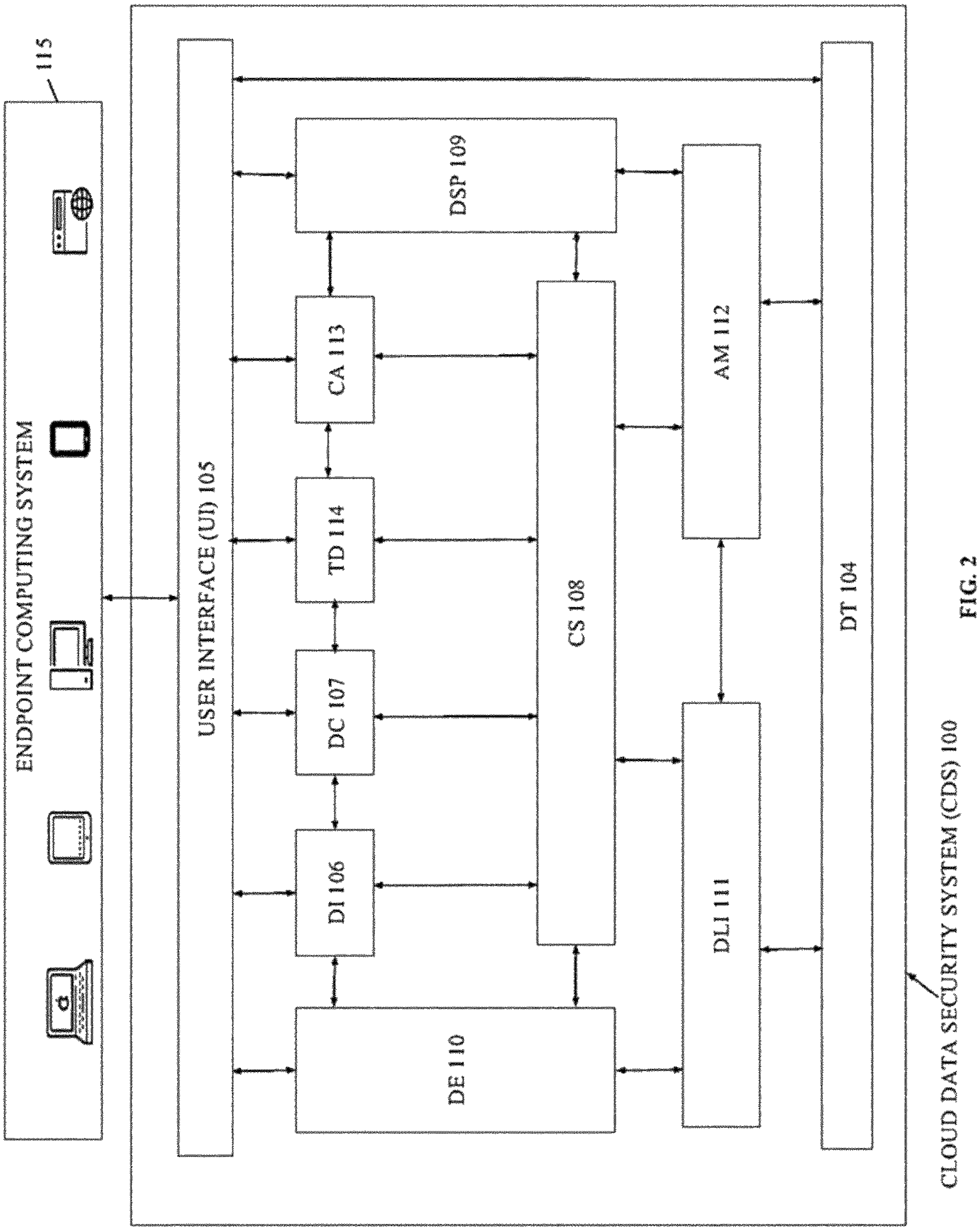
FIG. 2 shows a diagrammatic view of functional module interactions and related connections of the cloud data security system according to an exemplary embodiment.

Example embodiments of DMM 101 are now provided as shown in FIG. 1B, and FIG. 2. In an exemplary embodiment, cloud data security system comprises Data Identity (DI) 106, Data Classification (DC) 107, Content Scanning (CS) 108, Data Transfer (DT) 104, and Text Detection (TD) 114 modules within the DMM 101.

In certain exemplary embodiments, the DI 106 implements functionality necessary to create and manage a list of data classification categories, identity attributes along with a set of data filters such as but not limited to keywords and search patterns and the like, and conditions which can be used to determine sensitivity of the data; classification category, identity attributes, and associated security settings, etc.

In certain exemplary embodiments, the DC submodule 107 implements functionality necessary to determine and apply classification settings such as but not limited to, classification category (examples include: secret, confidential, internal, private, public etc.), visible classification markings, confidentiality statements (examples include: 'secret—distribution restricted', 'confidential—limited distribution' etc.), and associated identity attributes such as a) sub-category b) classification status c) classification date d) classified by e) sensitive (yes/no) etc., to the data stored in the cloud system either automatically or semi-automatically with the user input.

In certain exemplary embodiments the CS submodule 108 implements functionality necessary for scanning and analyzing sensitive content within a file stored in a cloud system as per predefined rules and policies. In certain exemplary embodiments, CS 108 converts content of the files into searchable text by parsing, indexing, hashing and tokenizing before performing the scan. Once these actions are complete, CS 108 identifies content that matches keywords, search patterns such as regular expressions, and conditions defined in the DI 106 and Data security policy (DSP) 109.

In certain exemplary embodiments the DT submodule 104 provides an abstraction layer through which CDS 100 and user interactions such as application of classification, encryption, security settings, etc., can be stored into various data storage repositories such as an external database, file metadata, user properties etc. Other submodules of the CDS 100 use functionality provided by the DT 014 to enable reading/writing of the data from/into the cloud systems where the data is stored. In some exemplary embodiments the DT 104 performs various compatibility checks when transferring the data into the different storage repositories.

In certain exemplary embodiments the TD submodule 114 implements text extraction functionality using Optical Character Recognition (OCR) technology to identify sensitive content in various file types such as PDFs, images, etc.

Example embodiments of the DSM 102 are now provided as shown in FIG. 1B and FIG. 2. In an exemplary embodiment, the CDS 100 comprises Data Security Policy (DSP) 109, Data Loss Identification (DLI) 111, Data Encryption (DE) 110, and Context Awareness (CA) 113 modules within the DSM 102.

In certain exemplary embodiments the DSP submodule 109 implements functionality to create and manage data governance, data security policies and rules related to classification, encryption, and data loss/leak notifications. Typical rules are specified in the 'IF< > THEN < >' format. Upon detecting the potential data loss or leak events, the DSP 109 checks if the <condition> for a security rule, and if true, then the corresponding <action> is enforced. When there are a large number of rules DSP 109 uses optimization algorithms and implements specialized data structures to enable fast execution of rules, control checks and remediation actions.

In some exemplary embodiments the DSP 109 may prompt the user, during the process of creating the data security policy and related controls, to select a predefined set of data loss prevention (DLP) and Information Rights Management (IRM) rules. Alternately, the DSP 109 may provide the user an option to create rules according to an organization's data governance policy and related controls. Examples of data loss prevention (DLP) rules include, but are not limited to, rules that: a) prevent collaborators of a file that is stored in the cloud system from adding new collaborators; b) prevent collaborators of a file that is stored in the cloud system from changing existing access settings; c) prevent collaborators of a file that is stored in the cloud system from removing existing collaborators; d) prevent collaborators from printing, downloading or copying the file or content with in the file which is stored in the cloud system; e) prevent collaborators from making the file private (in other words, deleting all other existing collaborators); f) prevent collaborators from moving the file from one folder to another; g) prevent collaborators from changing the password required to access or modify the file that is stored in the cloud system; and h) restrict third-party access.

In certain exemplary embodiments, the DLI submodule 111 implements functionality necessary to identify potential data loss or leak events based on security policies and rules defined in the DSP 109 and/or various other factors such as file sharing settings, usage patterns, keywords, metadata attributes, user inputs, Information Rights Management (IRM) rules etc. In some exemplary embodiments DLI 111 also identifies potential data loss or leak events by using machine learning algorithms such as but not limited to natural language text analysis, Zero-Shot learning, etc.

In certain exemplary embodiments the DE submodule 110 implements critical operations such as keyless encryption and decryption of specific text or select portion(s) of a file (called field-level) stored in a cloud system. The DE submodule 110 communicates with other modules as shown in FIG. 2 to identity content that needs to be encrypted and to transfer encryption event data such as encryption datetime, encryption flag (i.e. manual or automatic), exceptions securely to various storage services such as database and/or file, user properties.

In certain exemplary embodiments the Context Aware (CA) submodule 113 implements functionality necessary to determine appropriate classification and data protection action(s) to help users apply optimal security settings. The CA submodule 113 determines the above-mentioned functions based on distributed knowledge gathered through "peer knowledge", i.e. by collecting behavior of other users who use the cloud system and perform similar job duties in similar industry. In some embodiments, the CA 113 determines, recommends, and applies optimal security settings to the data stored in the cloud system by aggregating information collected through other user's actions or inputs, and by implementing machine learning algorithms.

In certain exemplary embodiments, a Real-time Notifications Module (RNM) 103 contains an Alerts module (AM) 112 which implements functionality necessary to alert users and/or administrators of the cloud system in real-time in the event of a potential data loss or leak. AM 112 interacts with other modules as shown in FIG. 2 to determine when to deliver the alert. In an exemplary embodiment, CDS 100 includes a Real-time Notifications Module (RNM) 112 that allows users of the cloud system to create and manage a list of potential data loss or leak event notification rules and notification delivery options such as via Email, SMS, MMS, Push method, etc. During the process of configuring the notification rules and delivery options, RNM 112 may prompt the user to either select a predefined set of notification rules or may provide the user an option to create new rules according to the user's preference and/or organization's data security policy and related controls. Typical notification rules are specified in the 'IF< > THEN < >' format. Upon detecting the potential data loss or leak event, RNM checks if the <condition> for a notification rule is satisfied, and if so, the corresponding notification is delivered. Examples of such notification rules include, but are not limited to, a file stored in the cloud system is downloaded by an unauthorized user or application; an unauthorized device gains access to the data stored in the cloud system; a file stored in the cloud system is accessed from a geographic location which is not in close proximity to the user's geographic location, etc.

In an exemplary embodiment, CDS 100 contains a User Interface (UI) module 105, which provides graphical interface for users of a cloud system to intuitively and efficiently interact with CDS 100 via endpoint computing systems (clients) 115 as shown in FIG. 1A and FIG. 2. UI 105 enables the server-side functionalities as a RESTful interface and the data is typically exchanged in JSON format with the endpoint computing system 115 i.e. Mobile, Desktop, Web etc. The client-side source code usually run on the endpoint computing system 115 and interacts with CDS 100 primarily using a RESTful application program interface (API).

In certain exemplary embodiments, the creation and maintenance of the data governance, security policies, and potential data leak or loss notification rules described herein may be restricted to administrators of a cloud system in order to maintain standards and consistency of classification categories, associated identity attributes, and related configurations across an organization.

Various examples of user flow for the CDS 100 are now provided. According to some exemplary embodiments, an administrator of a cloud system installs and enables CDS 100 for users of the cloud system within an organization. Once the user (in this case an employee) authorizes the CDS 100, the user interface (UI) 105 of the CDS 100 opens up automatically within a file stored in the cloud system. From the UI 105, the user can identify potential data loss risks, identify internal and external collaborators of the file, and perform other operations. In general, below listed operations are available to the user from this interface such as, but not limited to: data classification; encryption and decryption of sensitive content or select portion(s) of a file; assign information rights management (IRM) settings such as but not limited to remove external collaborators; make file private; remove domain level sharing settings; restrict specific IP addresses; restrict access to non-business domains; remove public sharing settings etc. Set policies in real-time for potential data loss/leak notification, and data loss prevention (DLP) rules such as but not limited to: prevent sharing, prevent decryption, prevent download, prevent printing, prevent copying the file content etc.

Figure 6:
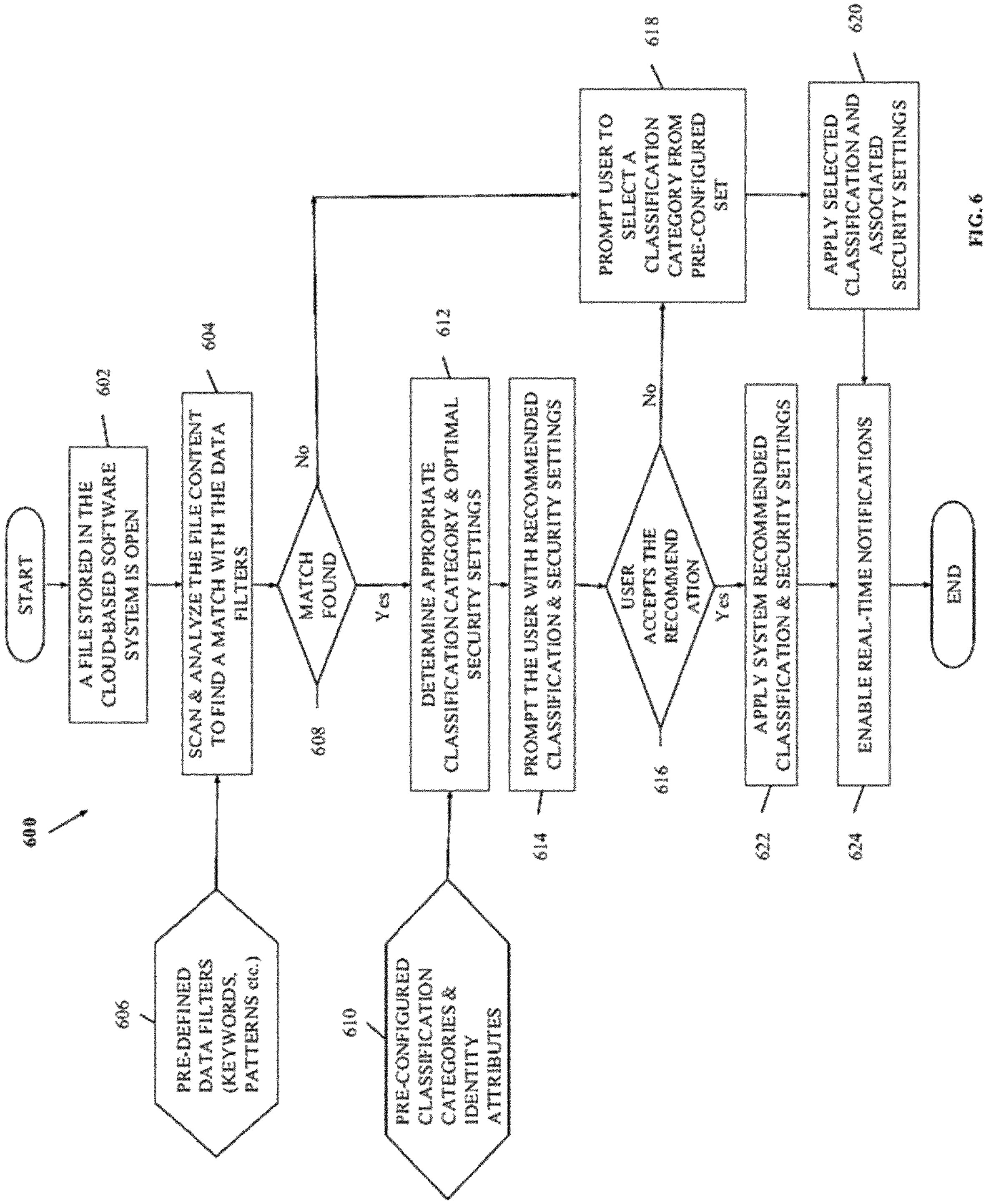
FIG. 6 depicts a flow diagram illustrating an exemplary embodiment of a process of classification of the data and application of optimal security settings to the data stored in a cloud system, semi-automatically with the user input.

FIG. 6 depicts a flow diagram illustrating an exemplary process of data classification, application of security settings, and associated attributes to the data stored in a system such as, but not limited to, a cloud system and the like, semi-automatically with the user input. In certain exemplary embodiments, the CDS 100 scans, parses, and analyzes the content of a file stored in a cloud system when a user having permissions to create and/or modify the file opens it. The CDS 100 analyzes the content of the file to find a match with predefined data filters configured in the DI 106 module where the match is derived using information filtering, information retrieval, indexing, and relevancy ranking methods such as, without limitation, vector space modeling. In some other embodiments, the CDS 100 may determine appropriate classification category and optimal security settings automatically by taking pre-configured classification categories and identity attributes as a data input and by using an algorithm such as, but not limited to, a machine learning algorithm, and prompt the user to apply the recommended classification, security settings, and associated identity attributes. The steps taken by one such exemplary embodiment are illustrated in the flow diagram 600 of FIG. 6. In step 602, a user opens a file stored in a cloud system. In step 604, the content of the file is analyzed for a match using algorithms and routines such as, but not limited to, vector space modeling against predefined data filters and keywords, illustrated as data input at 606. If a match is found in step 608, a classification category and associated security settings such as information rights management (IRM) or data loss prevention (DLP) settings are determined in step 612 using an algorithm that functions based on submodules CS 108, TD 114, DC 107, DSP 109, DE 110, DT 104 and pre-configured classification and identity attributes 610. The determined classification and security settings are presented to the user in step 614 who then have an option to accept or reject such recommendations in step 616. If the user accepts the system recommendations, the accepted classification and security settings along with associated identity attributes are applied to the file stored in the cloud system in step 622. Alternately, if the user rejects the system recommendations in step 616, the exemplary embodiment prompts the user to select a classification category from the pre-configured set 610 in step 618. Once the user selects the classification category from predefined set in step 618, the CDS 100 applies the selected classification, associated security and identity attributes to the file in step 620. If there was no match found in step 608, the CDS 100 prompts the user in step 618 to select a classification category from a pre-configured set 610. When the classification markings, security settings and associated identity attributes are applied to the file stored in the cloud system in either step 620 or 622, CDS 100 enables real-time data loss prevention notifications associated with such classification or security settings or user preferences in step 624 to provide an indication of potential data loss or leak to the user and/or administrators of the cloud system. In an exemplary embodiment, the process 600 of FIG. 6 is applied each time a user creates or modifies a file stored in a cloud system.

Figure 7:
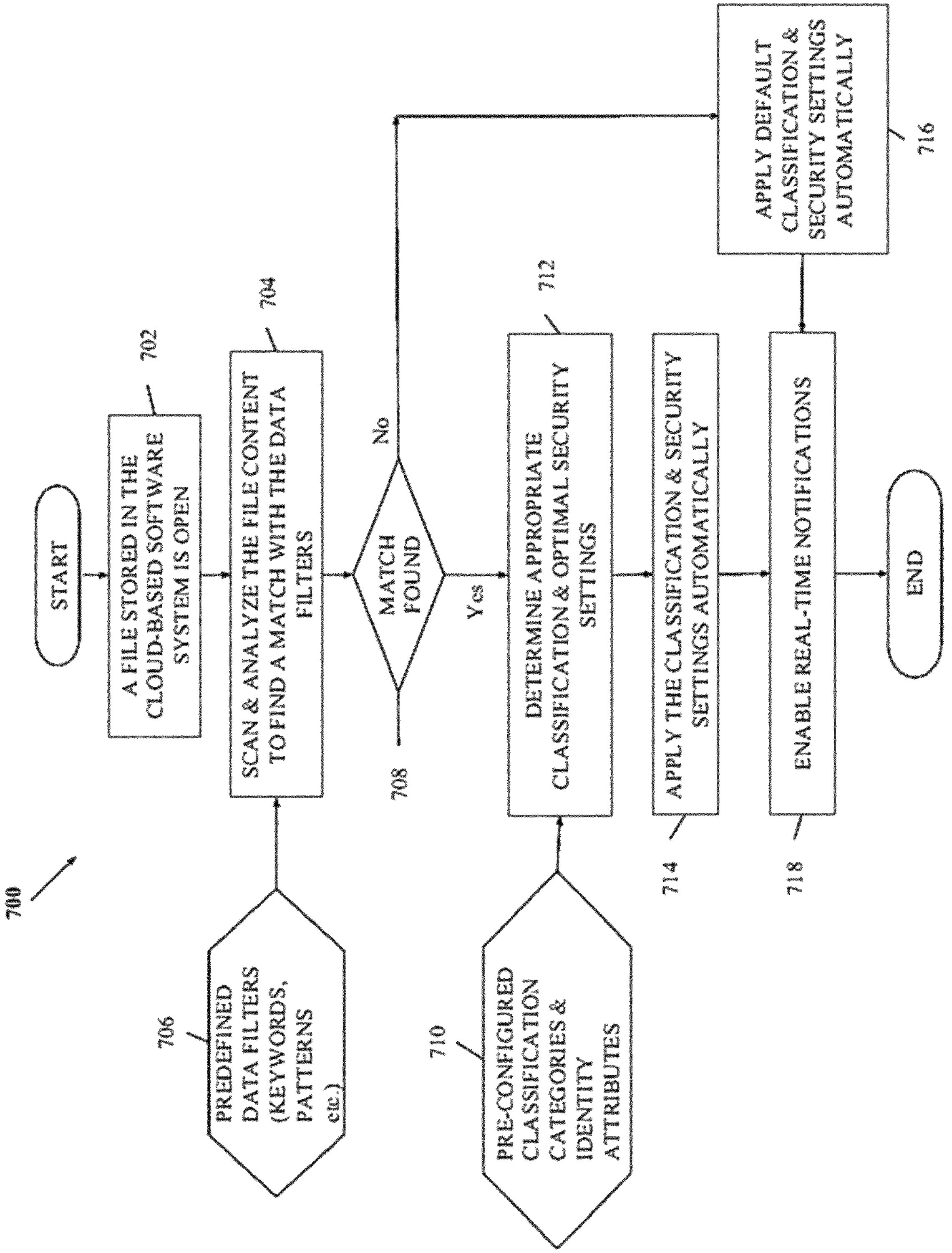
FIG. 7 depicts a flow diagram illustrating an example process of automatic data classification and application of optimal security settings to the data stored in a cloud system.

FIG. 7 Depicts a flow diagram illustrating an example process of classification and application of security settings and associated attributes to the data stored in a system such as, but not limited to, a cloud system and the like automatically. In certain exemplary embodiments, the CDS 100 analyzes the content of a file stored in a cloud system when a user having permissions to create and/or modify the file opens it. This analysis may be performed using data filters configured in the data identity module (DI) 106 and a match with the data filters and keywords are derived using information filtering, information retrieval, indexing, and relevancy ranking methods such as, without limitation, vector space modeling. The CDS 100 may determine and apply appropriate classification and optimal security settings automatically using an algorithm such as, but not limited to, a machine learning algorithm. The steps taken by one such exemplary embodiment are illustrated in the flow diagram 700 of FIG. 7. In step 702, a user having access to a cloud system opens a file stored in the cloud system. In step 704, the content of the file is analyzed for a match against predefined data filters and keywords, illustrated as data input at 706 using algorithms and routines such as, but not limited to, vector space modeling. If a match is found in step 708, a classification category and associated security settings such as information rights management (IRM), data loss prevention (DLP) settings are determined in step 712 using an algorithm that functions based on submodules CS 108, TD 114, DC 107, DSP 109, DE 110, DT 104, and pre-configured classification and identity attributes 710. The determined classification, security settings and associated identity attributes are then applied to the file stored in the cloud system automatically in step 714. If there is no match with predefined data filters and keywords found in step 708, the CDS 100 applies the default classification, security settings, and associated identity attributes to the file stored in the cloud system automatically in step 716. When the classification, security settings, and associated identity attributes are applied to the file stored in the cloud system in either step 714 OR 716, the CDS 100 enables real-time data loss prevention notifications associated with such classification or security settings or user preference in step 718 to provide an indication of potential data loss or leak to the user and/or administrator of the cloud system. In an exemplary embodiment, the process 700 of FIG. 7 is applied each time a user creates or modifies a file stored in a cloud system.

Figure 8:
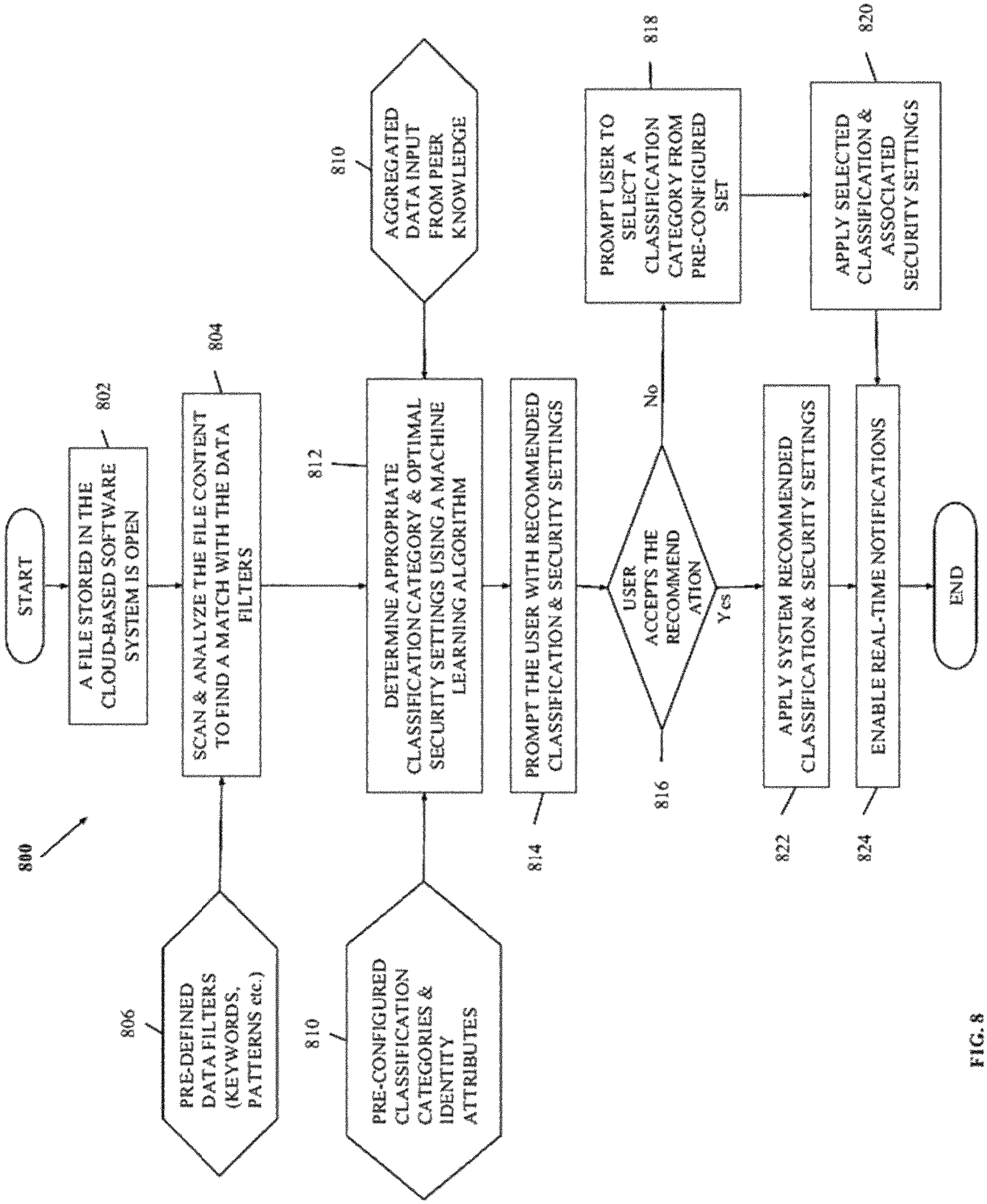
FIG. 8 depicts a flow diagram illustrating an exemplary embodiment of a process of semi-automatic data classification and application of optimal security settings based on peer knowledge.

FIG. 8 Depicts a flow diagram illustrating a process, according to an exemplary embodiment, of securing the data stored in a system such as, but not limited to, a cloud system and the like using 'peer knowledge'. In an exemplary embodiment, the CDS 100 provides recommended classification and optimal security settings to the users of a cloud system. These recommendations are based on aggregated information collected through other user's (peer): a) actions such as, but not limited to, application of security settings, classification category, and/or data loss notification rules; b) attributes such as other user's organizational type (example: manufacturing, insurance, banking, retail, etc.), other user's functional area (example: finance, HR, marketing, etc.), other user's geographic location (city, country etc.), other user's language, type of data that other users handle routinely, type of security settings which have been applied to a particular category of data previously; and c) by using machine learning algorithms. The steps taken by one such exemplary embodiment are illustrated in the flow diagram 800 of FIG. 8. In step 802, a user opens a file stored in a cloud system. In step 804, the content of the file is analyzed for a match against predefined data filters and keywords, illustrated as data input at 806 using algorithms and routines such as, but not limited to, vector space modeling. An appropriate classification category, and optimal security settings are determined in step 812 based on aggregated information collected from peers and pre-configured classification and identity attributes which are passed as data put to a machine learning algorithm such as, logistic regression, decision trees, etc., in step 810. The determined classification and security settings are presented to the user in step 814 who then has an option to accept or reject such recommendations in step 816. If the user accepts the system (CDS 100) recommendations, the accepted classification, security settings, and the associated identity attributes are applied to the file stored in the cloud system in step 822. Alternately, if the user rejects the system recommendations in step 816, the system prompts the user to select a classification category from the pre-configured set of categories in step 818.

Once the user selects the classification category from pre-defined set in step 818, the CDS 100 applies the selected classification, associated security, and identity attributes to the file in step 820. When the classification markings, security settings and associated identity attributes are applied to the file stored in the cloud system in either step 820 OR 822, the CDS 100 enables real-time data loss prevention notifications associated with such classification or security settings or user preference in step 824 to provide an indication of potential data loss or leak to the user and/or administrator of the cloud system. In certain exemplary embodiments, the process 800 of FIG. 8 is applied each time a user creates or modifies a file stored in a cloud system.

An example use case of 'Peer Knowledge' is now described. Bob a financial analyst working at a bank modifies a quarterly business review report stored in a cloud system for example Google Drive. the CDS 100 then automatically determines classification category of the data as 'Confidential' and recommends that Bob apply security settings such as, restrict download access, remove external collaborators, encrypt select content within the file, etc., based on other financial analysts who use similar cloud system, a CDS 100, and work in the same geographic location, and/or another bank. In this example the CDS 100 determines an appropriate data classification category and optimal security settings by collecting the actions of financial analysts working in a banking sector, and those who use a CDS 100 and similar cloud system, and passing the aggregated information collected as a data input to a machine learning algorithm. Thus, the CDS 100 makes recommendation of what classifications and security settings have been most successful or have the best track record of keeping similar data safe. Such recommendations have the potential to further enhance proper security decisions amongst users of a cloud system.

In some exemplary embodiments, the CDS 100 determines and applies appropriate classification categories, optimal security settings, and associated identity attributes automatically to the data stored in a cloud system automatically. Such settings and classifications are determined based on aggregated information collected from peers, and pre-configured classification and identity attributes which are passed as data put to a machine learning algorithm such as, logistic regression, decision trees, etc. The aggregated information collected from peers include but not limited to: a) actions such as, but not limited to, application of security settings, classification category, and/or data loss notification rules; and b) attributes such as other user's organizational type (example: manufacturing, insurance, banking, retail sales, etc.), other user's functional area (example: finance, HR, marketing, etc.), other user's geographic location (city, country etc.), other user's language, type of data that other users handle routinely, type of security settings which have been applied to a particular category of data.

Figure 9:
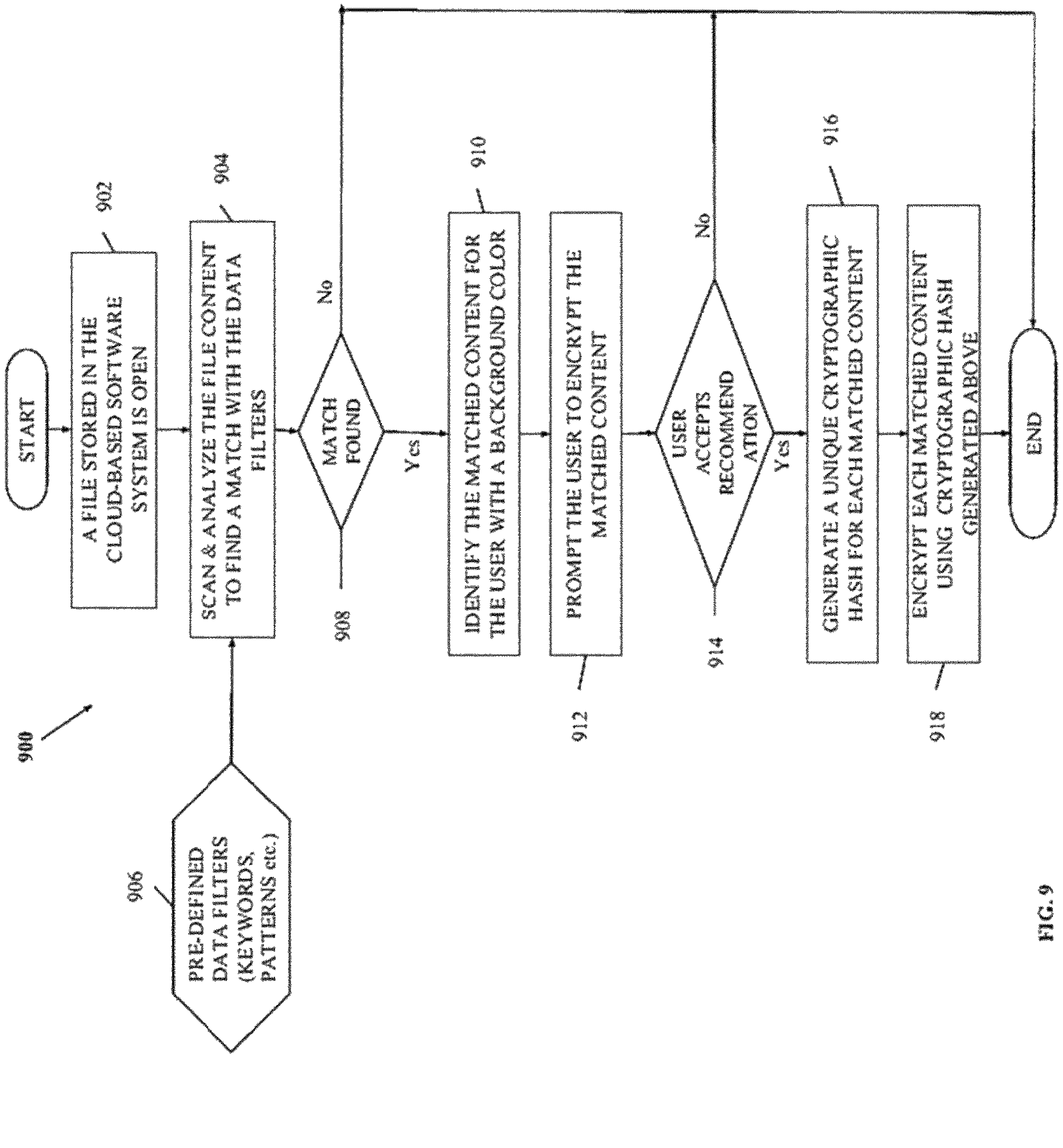
FIG. 9 depicts a flow diagram illustrating an example process of field-level keyless encryption of sensitive data or select portions of file that is stored in a cloud system.

FIG. 9 Depicts a flow diagram illustrating an example process of securing data stored in a system such as, but not limited to, a cloud system and the like, using 'field-level keyless encryption'. In some exemplary embodiments, the CDS 100 identifies sensitive personal, private or business content stored in a file which resides in a cloud system, and provides an option to the user having ownership rights to the file to encrypt only specific text or select portion(s) of a file which match pre-defined data filters configured in the DI module 106 without any keys or passwords. In exemplary embodiments this can be referred as "field-level keyless encryption." In such exemplary embodiments, this encryption may be performed using a secure hash algorithm such as SHA-2, SHA-3, or an equivalent. An advantage of these embodiments is that users having ownership rights to the file do not have to generate or remember passwords or passphrases and the like, in order to encrypt or decrypt content of the file. In an exemplary embodiment, the encryption is limited to only sensitive content stored in the file. In such an embodiment, the collaborators of the file can read and edit non-sensitive content of the file seamlessly without any restrictions. Thus, such embodiments provide an optimal way of encrypting the data without creating friction between data usage and its security. The steps taken by one such exemplary embodiment is illustrated in the flow diagram 900 of FIG. 9. In step 902, a user having ownership rights to a file stored in a cloud system opens it to view/modify the content. In step 904, the CDS 100, scans, parses, and analyzes content of the file to find a match against predefined data filters, illustrated as data input at 906 using algorithms and routines such as, but not limited to, vector space modeling. If a match is found in step 908, the CDS 100 identifies the matching text (for example, highlights the matching text in specific background color) for the user in step 910, according to the user or organization's preferences, and also indexes and tokenizes the matching text to enhance search capabilities of sensitive data stored in the cloud system. In step 912, the CDS 100 prompts the user to encrypt the select content of the file which matches pre-defined data filters. If the user accepts the recommendation in step 914, the CDS 100 generates a unique and unpredictable cryptographic hash for each matched text which is an outcome of step 908, using a cipher and a secure hash algorithm in step 916. In step 918, the CDS 100 encrypts each matched text which is an outcome of step 908, with the unique cryptographic hash generated in step 916. In such an embodiment, the CDS 100 generates a unique cryptographic hash value which can't be used by an unauthorized user or application to decrypt the encrypted content using the standard decryption techniques or programs. Thus, only a user having ownership rights to the file can decrypt the encrypted content using the CDS 100. In another exemplary embodiment, a user having ownership rights to a file stored in a cloud system will be able to decrypt the encrypted content using the decrypt option provided in the CDS 100 as and when needed.

Figure 11:
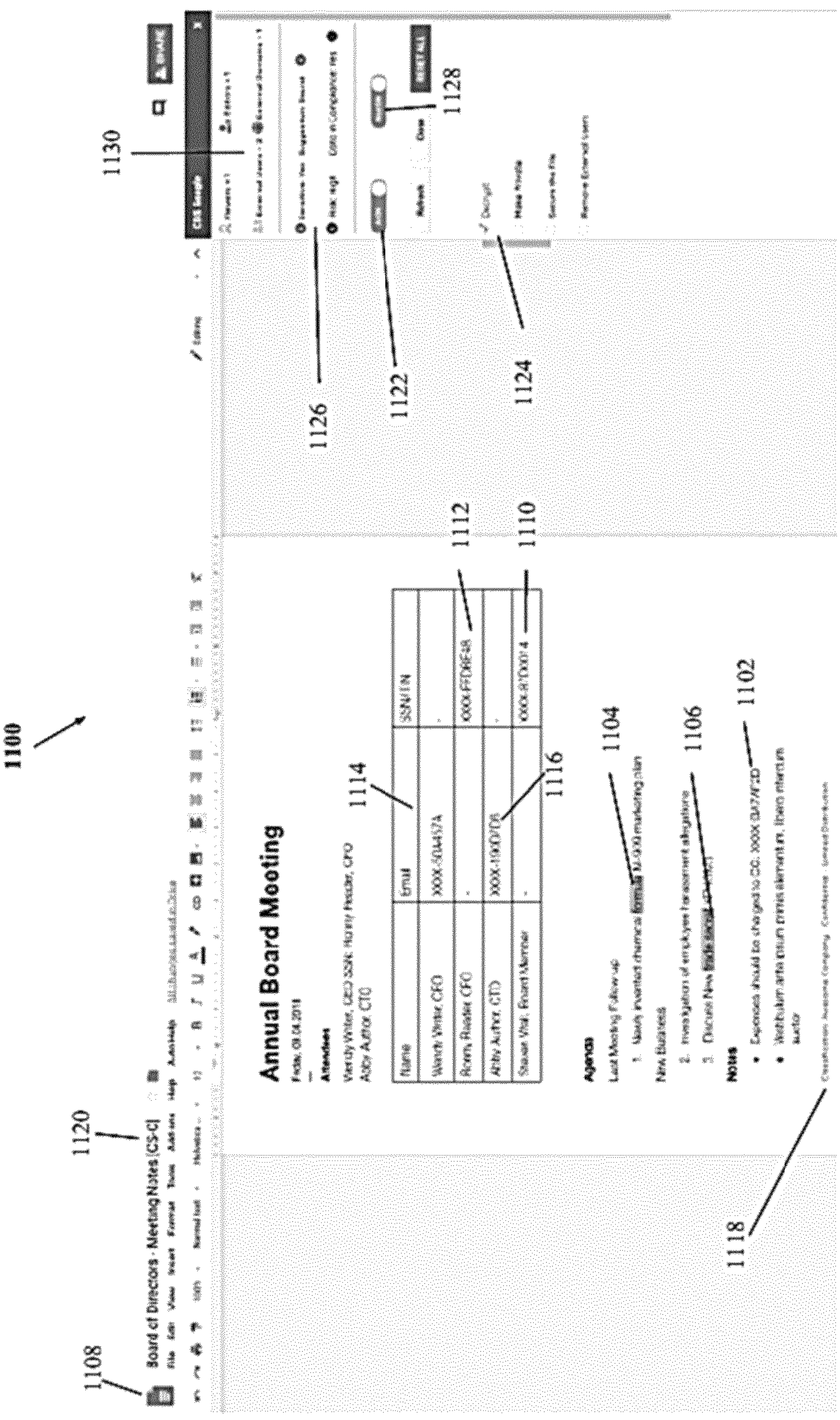
FIG. 11 illustrates an outcome of the field-level keyless encryption where sensitive data has been encrypted in accordance with organization's sensitive data filters, data security policies, data governance rules, and/or related controls according to an exemplary embodiment.

In some other exemplary embodiments, the CDS 100 identifies sensitive personal, private, or business content stored in a file which is stored in a cloud system, and automatically encrypts sensitive content or select portion(s) of the file which match with predefined data filters configured in the DI module 106 without any keys or passwords as illustrated in the user interface 1100 of FIG. 11. In such exemplary embodiments, the encryption may be performed using a secure hash algorithm such as SHA-2, SHA-3, or an equivalent. An advantage of such embodiment is that users having ownership rights to the file do not have to generate or remember passwords, passphrases, and the like, in order to encrypt or decrypt content of the file. In an exemplary embodiment, the encryption is limited to only sensitive content 1002, 1010, 1012, 1014, and 1016 which matches a search pattern defined in the DI module 106 stored in the file 1108 as illustrated in 1102, 1110, 1112, 1114, and 1116 of FIG. 11. In such embodiments, the collaborators of the file which is stored in a cloud system can read and edit non-sensitive content of the file seamlessly without any restrictions. Thus, such embodiments provide an optimal way for encrypting only sensitive data without friction between data usage and its security.

An example use case of 'field-level keyless encryption' is now described. Matt, an IT engineer working at a manufacturing firm requests Karen, a HR manager in the firm to share a file containing employee data via a cloud system (for example Google Drive) to perform an IT systems test. Karen creates the list, uploads it to Google Drive and uses the CDS 100 which automatically encrypts the Personally identifiable information (PII) data (for example, social security numbers) before sharing the file. When Matt receives the file, he can perform the system testing without viewing or altering the actual social security numbers. In this case, Karen didn't generate any passwords or keys to encrypt the PII data and Matt was not required to request a password to read or test the file. The whole encryption process is seamless without any friction between usage and security. Encrypting only specific text such as social security numbers in W2, MRN numbers in after visit summaries, Account numbers in bank statements, etc., are some other example use cases of field-level keyless encryption.

Figure 10:
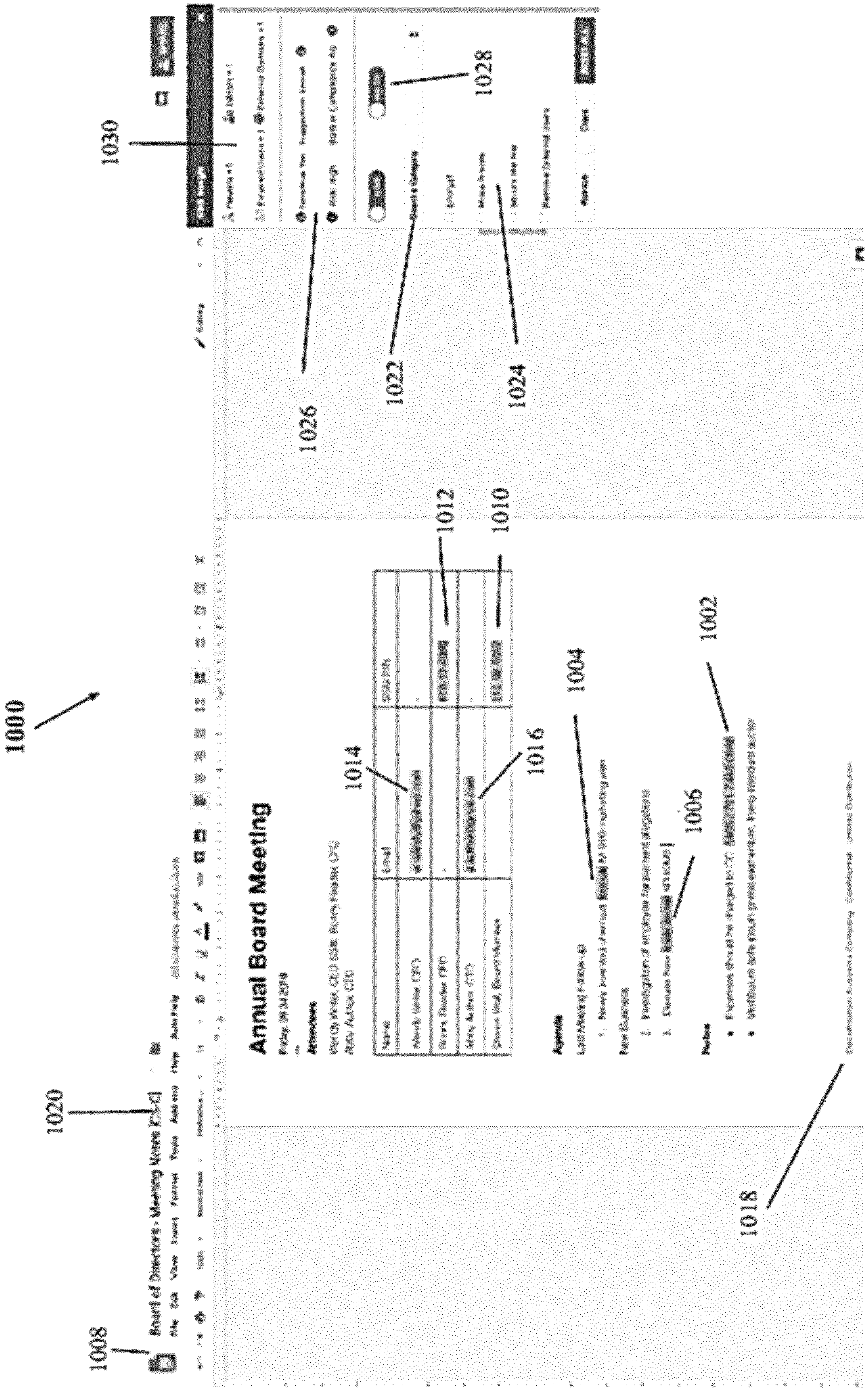
FIG. 10 shows a user interface displaying a file stored in a cloud system where keywords, and sensitive data is identified (highlighted) for the user according to an exemplary embodiment.

FIG. 10 illustrates an exemplary embodiment of a user interface 1000 that comprises a display of a document 1008 being analyzed. In certain exemplary embodiments, the CDS 100 identifies and highlights data such as keywords, search patterns etc., defined in the DI module 106 and presents them to a user having ownership rights to a file stored in a system such as, but not limited to, a cloud system and the like, with a background color as illustrated in 1002, 1004, 1006, 1010, 1012, 1014, and 1016 of FIG. 10. This highlighting is intended to help users seamlessly identity sensitive personal, private, and business content. Other methods of drawing a user's attention such as tagging, flashing, inverse text, underlining the text with a color, etc., may be used in an exemplary embodiment. This identification can take place as the user enters the content into a file that is being monitored by the CDS 100. The identification may also be performed on a file stored in a cloud system before the user retrieves or views the file content. In another exemplary embodiment, the CDS 100 displays information about internal and external collaborators of a file stored a cloud system as shown in 1030 of FIG. 10 along with sensitivity of the content stored in the file, and risk level (low, medium, high) of a potential data loss/leak as shown in 1026 of FIG. 0.10. In certain embodiments, the CDS 100 creates awareness in the users native to the cloud as described herein and illustrated in process 1000 of FIG. 10. This helps users to take right actions that prevent loss of sensitive data and thus eliminates additional training needs or costs related to data governance and security.

Figure 12:
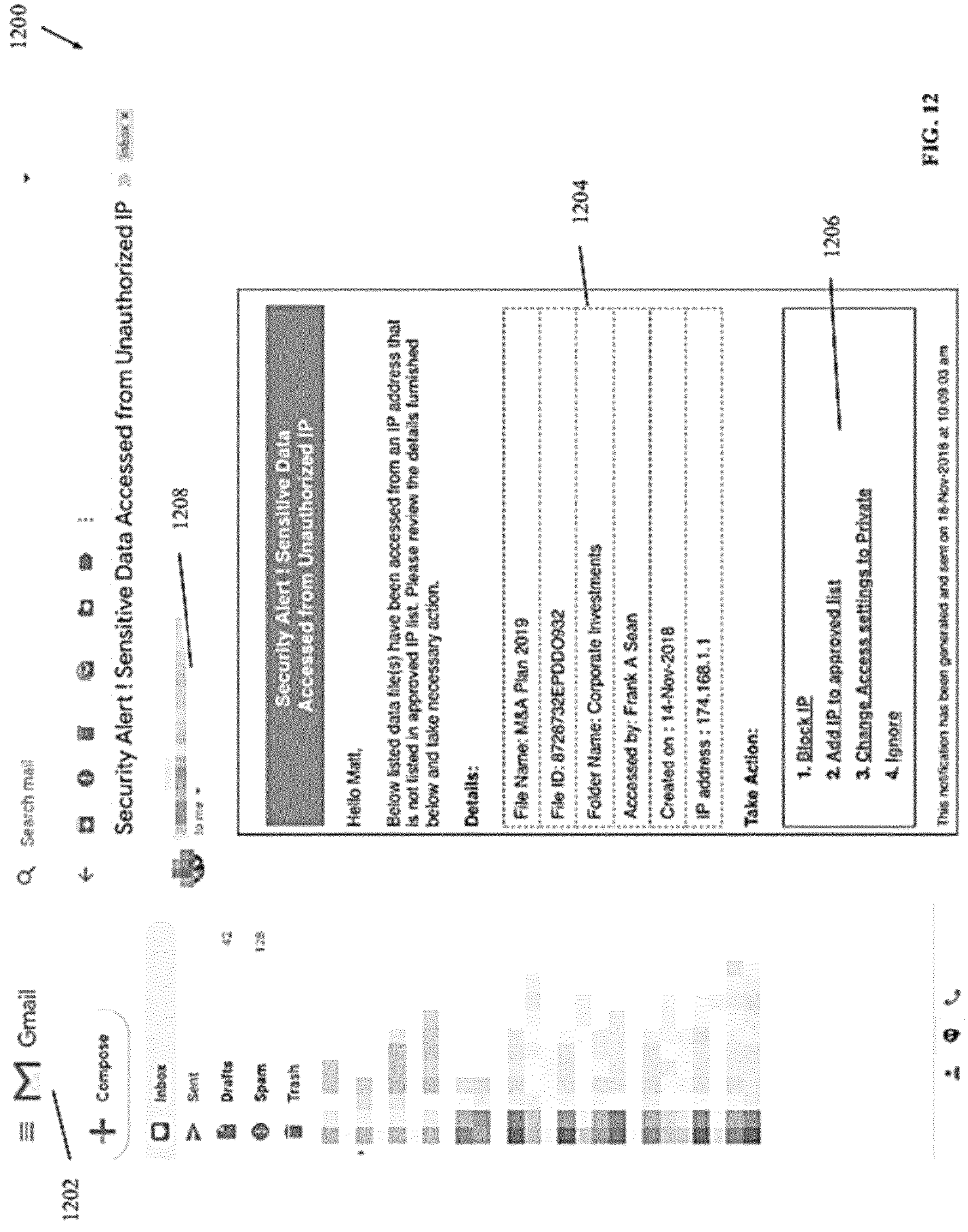
FIG. 12 shows an email interface of real-time actionable data loss notifications according to an exemplary embodiment.

FIG. 12 shows an example user interface 1200 of a potential data loss or leak notification delivered to user of a cloud system as an email in real-time. In an exemplary embodiment, the CDS 100 determines potential loss or leak of sensitive data stored in a system such as, but not limited to, a cloud system and the like, by continually monitoring: 1) activities of users of the cloud system; 2) activities or changes related to the data stored in the cloud system using RESTFul APIs; and 3) determining context of each change using a machine learning algorithm such as but not limited to Zero-shot learning. In another exemplary embodiment, the CDS 100 monitors: a) activity and/or changes related to the cloud system to check if the data stored in the cloud system is accessed from an IP address that is not listed under the list of IP addresses defined by the user or administrator of the cloud system in the DI module 106; b) activity and/or changes related to the cloud system to check if the data stored in the cloud system is accessed from a geographic location which is not in close proximity to the user's geographic location; c) activity of users of the cloud system to check if the data is shared too permissively i.e. data has been shared publicly; d) activity and/or changes related to the cloud system to check if an unauthorized user gains access to the data stored in the cloud system; e) activity and/or changes related to the cloud system to check if an unauthorized 3rd party application gains access to the data stored in the cloud system; f) activity and/or changes related to the cloud system to check if an unauthorized device gains access to the data stored in the cloud system; g) activity and/or changes related to the cloud system to check if a large volume of the data is shared outside of the cloud system; h) activity and/or changes related to the cloud system to check if a large volume of the data is downloaded from the cloud system; or i) activity of the cloud system against organization's data security policies and/or data governance rules.

Alternatively, or additionally, exemplary embodiments use the cloud system's native reports such as, but not limited to, admin, login, user activity, change, audit reports, and related APIs to poll the cloud system continuously in real-time to detect changes in the cloud system configuration, user activities, data identity attributes such as category of the data, sensitivity, classification, security settings etc., and/or metadata such as time, person, location etc., and determines an abnormal events using DLI 111. When such an event is detected, the CDS 100 inspects the event to find a match with data filters that are defined in the DI module 106 or data governance and security rules, policies configured in DSP 109 by the user or an administrator of the cloud system.

In an exemplary embodiment, the CDS 100, after finding a potential loss or leak of data stored in a cloud system through previously stated methods, generates a notification and sends it to the user and/or an administrator 1208 of the cloud system in real-time via email, push notifications and/or mobile messaging services such as short messaging service (SMS) or Multimedia Messaging Service (MMS). An example of such potential data loss is illustrated in the user email interface 1202 shown in FIG. 12. Such a notification may comprise information such as, without limitation: a) File Name; b) File ID; c) File location such as parent folder; d) Last accessed by individual name; e) File creation date; f) File modified date; G) Incident detection time; and h) Potential Data Loss details such as unauthorized IP Address, device details, and geographic location as illustrated in 1204.

In an exemplary embodiment, the notification contains specific details about the potential data loss or leak along with actions 1206 that a user can take to prevent the loss or leak of the data. Once a response to the notification is received from the user, based on the user input, the CDS 100 takes an action as indicated by the user. Examples of such actions include but not limited to:

a) Prevent collaborators of the file stored in the cloud system to add new collaborators;
b) Prevent collaborators of the file stored in the cloud system to change existing access settings;
c) Prevent collaborators of the file stored in the cloud system to remove existing collaborators;
d) Prevent collaborators of the file stored in the cloud system from printing, downloading or copying the file;
e) Make the file stored in the cloud system as Private (i.e. remove all the existing collaborators);
f) Prevent collaborators of the file stored in the cloud system to moving the file from one location to another location such as folder;
h) Restrict unauthorized 3rd-parties from accessing the file stored in the cloud system; etc.

Alternatively, or additionally, if the notification is configured to generate actionable content, the CDS 100 pauses the monitoring of select file stored in the cloud system and prevents anyone except the user from accessing or altering the file until the user or an administrator of the cloud system takes necessary actions. In certain exemplary embodiments, the CDS 100 may also notify an administrator and/or create an incident record of the potential data loss or leak, as well as take other types of actions. In one example, the user or administrator of the cloud system may access the user interface of the CDS 100 to access or obtain the potential data loss or leak incident reports.

Figure 13:
FIG. 13 shows a mobile interface where a potential data loss notification has been delivered via a push notification in real-time according to an exemplary embodiment.

FIG. 13 illustrates an exemplary embodiment of a mobile user interface of actionable real-time potential data loss notification on a mobile device 1302. The notification being delivered as, but not limited to, SMS, push notification, MMS, and the like. FIG. 13 shows an exemplary push notification with introductory information 1304 in a concise and simple to understandable terminology. The message also displaying technical file metadata attributes 1306 such as, but not limited to: file name, location, last modified time, file owner and the IP address involved in the potential breach.

FIG. 14 illustrates an example of a graphical user interface of the CDS 100 as observed on a desktop computer. In certain exemplary embodiments, the CDS 100 provides an interface to apply classification, security settings and associated identity attributes to multiple files stored in a cloud system. An exemplary embodiment of such an interface 1400 is shown in FIG. 14. As shown at 1402, the interface 1400 may comprise a menu 1402 of the CDS 100. This menu 1402 allows the user to perform various actions, set preferences, and manage configurations. In the illustrated user interface 1400, a listing of files 1404 which are stored in a cloud system is presented to the user. As shown, the file metadata such as location of the file 1406, file modification date 1416 and the person who last modified the file 1418 is displayed in the exemplary embodiment. Previously applied classification categories 1408 as well as the type of sensitive content 1410 detected in each file is also displayed the interface 1400. In an exemplary module, keywords 1416 detected in the file which match the data filters defined via data identity module DI 106 may also be displayed to the user via the user interface 1400. In another exemplary embodiment, an indication 1414 of whether a real-time notification has been enabled will be also be displayed in the interface. In some embodiments, the CDS 100 will also provide an option to the user to take necessary actions 1420 to secure the data stored in a system such as but not limited to a cloud system and the like. Such actions without limitation include application of classification markings, modification of previously applied classification category, modification of file identity attributes such as file name, classification sub category, file sensitive level, etc., and application security settings such as but limited to IRM and DLP rules etc., enabling real-time notifications etc., on multiple files/folders at once.

Figure 15:
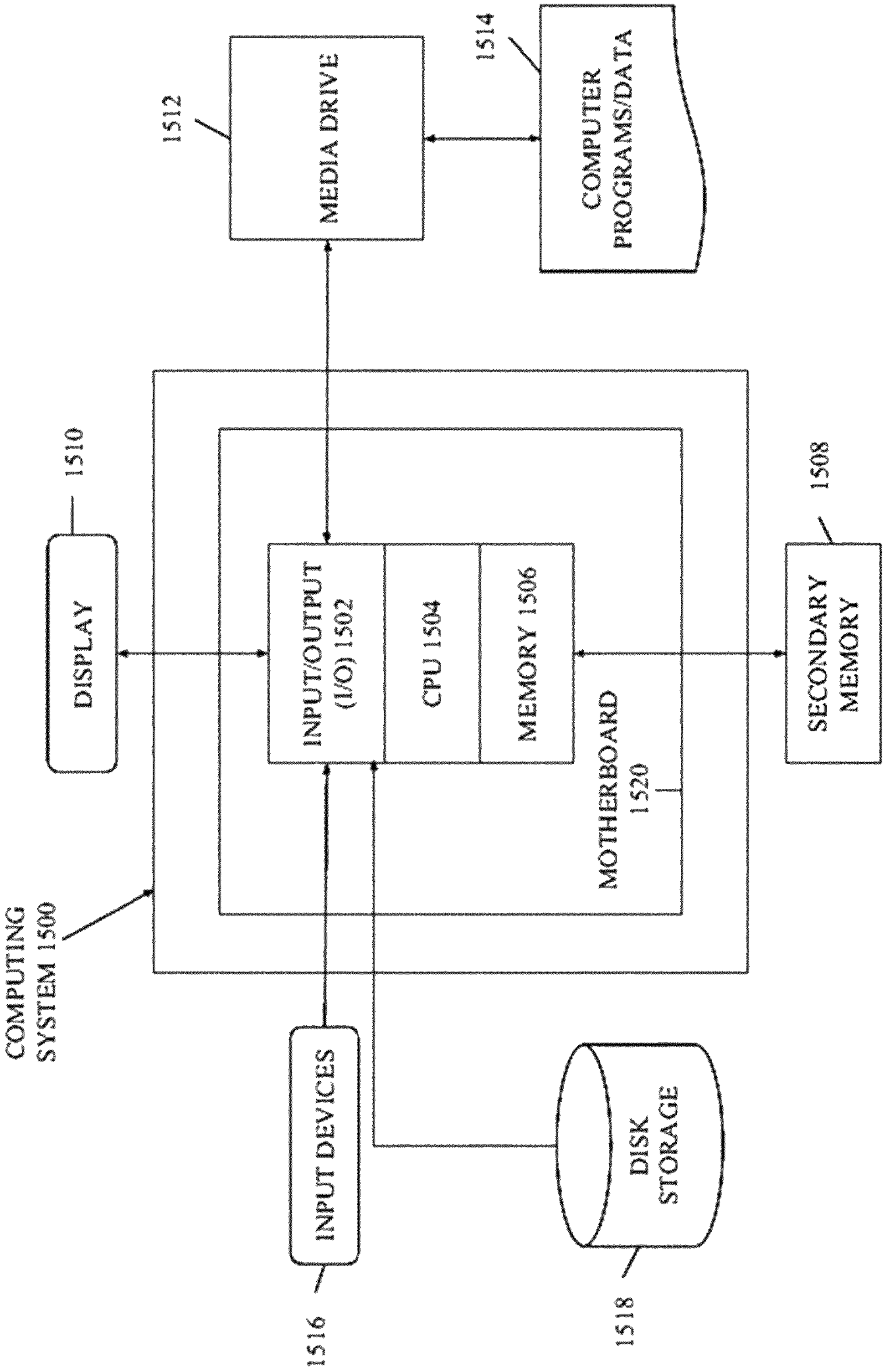
FIG. 15 depicts a computing system with a number of components used by an exemplary embodiment to perform any of the processes described herein.

FIG. 15 depicts an exemplary computing system 1500 with a number of components that may be used to perform any of the processes described herein. The main system 1500 includes a motherboard 1520 having an I/O section 1502, one or more central processing units (CPU) 1504, and a memory section 1506 such as random-access memory (RAM), which may have a secondary memory such as hard disk, optical disks, flash memory card 1508 etc., related to it. The I/O section 1502 can be connected to a display 1510, a keyboard and/or other user inputs 1516, a disk storage unit 1518, and a media drive unit 1512. The media drive unit 1512 can read/write a computer-readable medium, which can contain programs 1514 and/or data. The computing system 1500 can include a web browser (not shown). Moreover, it is noted that computing system 1500 can be configured to include additional systems in order to fulfill various functionalities. The computing system 1500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

It is additionally noted and anticipated that although the system is shown in its most simple form, various components and aspects of the system may be differently configured or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth.

What is claimed:

1. A system for classifying data stored in a cloud system comprising: a cloud data security system, configured to connect with the cloud system using an access token obtained from the cloud system, the cloud data security system comprising: at least one CPU; a memory; a user interface in communication with the CPU and the memory; and software instructions that when executed by the CPU, cause the CPU to: access data stored in the cloud system; scan the data; identify content in the data that matches a pre-defined filter; classify the data by automatically determining at least one identity attribute for the data based on the content, wherein the at least one identity attribute indicates a sensitivity of the data; and apply the at least one identity attribute to the data via metadata associated with the data;

wherein a security setting for the data stored in the cloud system is determined automatically based on at least one of: at least one identity attribute; a classification; the sensitivity; a predefined keyword; a string of characters; a search pattern; sharing settings; access permissions of the data; data security policies; data governance rules or related controls; or a machine learning algorithm; and wherein the security setting can be set to at least one of: preventing collaborators of the data stored in a cloud system from adding a new collaborator; preventing collaborators of the data stored in a cloud system from changing an existing access setting; preventing collaborators of the data stored in a cloud system from removing an existing collaborator; preventing collaborators of the data stored in a cloud system from printing, downloading or copying the data stored in the cloud system; removing access to the data from an existing collaborator; restricting the movement of the data stored in a cloud system; removing a collaborator of the data stored in a cloud system who is not part of the user's domain; preventing unauthorized users from accessing the data stored in a cloud system; protecting the data from unauthorized action; removing access to the data for a specific user; removing access to anyone with a location outside of the user's geolocation; setting an expiration date for a specific user access to the data stored in a cloud system; preventing collaborators of the data stored in a cloud system from editing certain portions of the data; or preventing collaborators of the data stored in a cloud system from encrypting or decrypting the data.

2. The system of claim 1, wherein the cloud data security system further comprises a distributed computing system with a plurality of the processors having access to the access token performing multi-thread scanning of the data stored in the cloud system asynchronously.

3. The system of claim 1, further configured to connect with a plurality of cloud systems by using a plurality of access tokens obtained from a respective cloud system and access the data stored in the cloud systems using the cloud system's Application Programming Interface.

4. The system of claim 1, wherein the cloud data security system is further configured to: encrypt the data stored in the cloud system without generating or using an encryption key, a password, or a passphrase.

5. The system of claim 1, wherein automatically determining the at least one identity attribute for the data stored in the cloud system comprises the following: analyzing the data stored in the cloud system to extract indexable text based on a predefined keyword, a string of characters, or a search pattern; tokenizing, hashing, or analyzing the extracted indexable text to determine the sensitivity of the data stored in the cloud system relative to the detected risk of loss or disclosure of the data stored in the cloud system; determine an appropriate identity attribute based on the sensitivity; wherein the at least one identity attribute comprises at least one of a category of the data, a sensitivity level, a classification, an encryption, or the security setting; store the at least one identity attribute in a metadata field; and assign at least one of: the at least one identity attribute, a visible marking, a tag, or a confidentiality statement to the content.

6. The system of claim 1, wherein the cloud data security system is further configured to: automatically assign the at least one identity attribute based on information collected from actions or behaviors of other users of the cloud data security system; automatically assign an optimal security setting to the data based on information collected from actions or behaviors of other users of the cloud data security system; and automatically encrypt select portions of the data based on information collected from actions or behaviors of other users of the cloud data security system; or recommend to a user: the at least one identity attribute based on information collected from actions or behaviors of other users of the cloud data security system; an encryption requirement for the data based on information collected from actions or behaviors of other users of the cloud data security system; and an optimal security setting for the data based on information collected from actions or behaviors of other users of the cloud data security system.

7. The system of claim 1, wherein the cloud data security system is further configured to identify select portions of the data stored in the cloud system for a user and encrypt the select portions of the data stored in the cloud system using a cryptographic hash.

8. The system of claim 1, wherein the cloud data security system is further configured to: generate an alert in real-time in response to detecting a potential data loss or leak event based on the at least one identity attribute; determine actions necessary to secure the data stored in the cloud system; deliver the alert via at least one of: a push notification, a short messaging service (SMS) or an email; generate a report with the alert and a listing of actions for a user; and at least one of: secure the data stored in the cloud system automatically; or secure the data stored in the cloud system semi-automatically.

9. The system of claim 8, wherein the alert is delivered to an end user of the cloud system, wherein the end user is not an administrator of the cloud system or does not have access to the cloud data security system.

10. The system of claim 1, wherein the cloud data security system is further configured to: store encrypted content in a location selected from within the cloud system where the data resides or an external data repository; allow decryption of the encrypted content only for a predetermined period of time; and decrypt and display the encrypted content using the cloud data security system.

11. The system of claim 1, wherein at least one identity attribute comprises at least one of a category of the data, a sensitivity level, a classification, an encryption, or the security setting.

12. A method of classifying data stored in a cloud system comprising: receiving an access token from the cloud system; connecting a cloud data security system to the cloud system using the access token received from the cloud system; accessing the data stored in the cloud system using an application programming interface; performing a scan of the data stored in the cloud system; identifying content in the data that matches a pre-defined filter; classifying the data by automatically determining at least one identity attribute for the data stored in the cloud system, wherein the at least one identity attribute indicates a sensitivity of the data; and applying the at least one identity attribute to the data via metadata associated with the data;

wherein a security setting for the data stored in the cloud system is determined automatically based on at least one of: at least one identity attribute; a classification; the sensitivity; a predefined keyword; a string of characters; a search pattern; sharing settings; access permissions of the data; data security policies; data governance rules or related controls; or a machine learning algorithm; and wherein the security setting can be set to at least one of: preventing collaborators of the data stored in a cloud system from adding a new collaborator; preventing collaborators of the data stored in a cloud system from changing an existing access setting; preventing collaborators of the data stored in a cloud system from removing an existing collaborator; preventing collaborators of the data stored in a cloud system from printing, downloading or copying the data stored in the cloud system; removing access to the data from an existing collaborator; restricting the movement of the data stored in a cloud system; removing a collaborator of the data stored in a cloud system who is not part of the user's domain; preventing unauthorized users from accessing the data stored in a cloud system; protecting the data from unauthorized action; removing access to the data for a specific user; removing access to anyone with a location outside of the user's geolocation; setting an expiration date for a specific user access to the data stored in a cloud system; preventing collaborators of the data stored in a cloud system from editing certain portions of the data; or preventing collaborators of the data stored in a cloud system from encrypting or decrypting the data.

13. The method of claim 12, wherein content within the data that is stored in the cloud system is identified using at least one of: a machine learning algorithm; or by parsing, extracting, or analyzing indexable text to find a match with at least one of: a predefined keyword; a string of characters; a search pattern; an organizational policy; or a user preference.

14. The method of claim 12, wherein automatically determining the at least one identity attribute of the data stored in the cloud system is performed by at least one of: a machine learning algorithm; or parsing, extracting or analyzing indexable text using on at least one of: a predefined keyword; a string of characters; a search pattern; an organizational policy; a user preference; or a pre-configured classification category.

15. The method of claim 12, further comprising encrypting select portions of the data stored in the cloud system, wherein the step of encrypting select portions of the data comprises a cryptographic hash generated using a secure hash algorithm such that an unauthorized user or application will not be able to view, retrieve or alter the encrypted content.

16. The method of claim 15, further comprising: identifying a file or specific portion of a file stored in the cloud system before and after the encryption; storing the cryptographic hash of the encrypted content in a location selected from within the cloud system where the data resides or an external data repository; allowing the decryption of the encrypted content only for a predetermined period of time; and decrypting and displaying the encrypted content using the cloud data security system.

17. The method of claim 12, wherein a potential loss or leak of the data stored in the cloud system is detected automatically using at least one of: the at least one identity attribute of the data; a classification of the data; the sensitivity of the data; a contextual relationship of the data to the user having access to the data; a predefined keyword; a string of characters; a search pattern; a periodic comparison of a user's activity with historical usage of the cloud system by the user and collaborators of the data; a data security policy; a data governance rule; a data governance control; or a machine learning algorithm.

18. The method of claim 12, further comprising: detecting a potential data loss or leak event based on the at least one identity attribute; generating an alert and reporting the alert to the user of the cloud system in real-time in the event of a potential data loss or leak; and determining a necessary action to secure the data stored in the cloud system in response to the detected potential data loss or leak.

19. The method of claim 12, wherein accessing the cloud system using the cloud system's Application Programming Interface comprises: accessing a collection of cloud-based Application Programming Interfaces which include event data, activity report data, app usage data, administrative data, or audit data or accessing other available Application Programming Interfaces to poll for data which is created or modified in the cloud system, downloaded from the cloud system, or uploaded to the cloud system.

20. The method of claim 12, wherein the at least one identity attribute for the data is recommended to a user of the cloud system based on information collected from actions or behaviors of other users of the cloud data security system.

21. The method of claim 12, wherein at least one identity attribute comprises at least one of a category of the data, a sensitivity level, a classification, an encryption, or the security setting.

22. The method of claim 12, wherein performing the scan of the data comprises asynchronously performing a multi-thread scan of the data.

* * * * *